US005814200A

United States Patent [19]
Pethig et al.

[11] Patent Number: 5,814,200

[45] **Date of Patent: *Sep. 29, 1998**

[54] APPARATUS FOR SEPARATING BY DIELECTROPHORESIS

[75] Inventors: Ronald Pethig; Gerardus Hendricus Markx, both of Gwynedd, Wales

[73] Assignee: British Technology Group Limited, London, England

[ * ] Notice: This patent issued on a continued prosecution application filed under 37 CFR 1.53(d), and is subject to the twenty year patent term provisions of 35 U.S.C. 154(a)(2).

[21] Appl. No.: 530,131

[22] PCT Filed: Mar. 31, 1994

[86] PCT No.: PCT/GB94/00702

§ 371 Date: Sep. 26, 1995

§ 102(e) Date: Sep. 26, 1995

[87] PCT Pub. No.: WO94/22582

PCT Pub. Date: Oct. 13, 1994

[51] Int. Cl.[6] ........................ G01N 27/26; G01N 27/447; G01N 27/453

[52] U.S. Cl. ............................................ 204/547; 204/643

[58] Field of Search ..................................... 204/547, 643; 209/127.1, 127.4

[56] References Cited

U.S. PATENT DOCUMENTS

| | | | |
|---|---|---|---|
| 1,498,911 | 6/1924 | Hatfield | 204/127.4 |
| 3,162,592 | 12/1964 | Pohl | 209/127.1 |

(List continued on next page.)

FOREIGN PATENT DOCUMENTS

| | | |
|---|---|---|
| 519250 | 12/1992 | European Pat. Off. . |
| 41 27 405 | 2/1993 | Germany . |
| 91/11262 | 8/1991 | WIPO . |
| 93/04199 | 3/1993 | WIPO . |

OTHER PUBLICATIONS

Senichi Masuda et al, "Separation of Small Partcles Suspended in Liquid by Nonuniform Traveling Field", IEEE Transactions on Industry Appln., vol. A23, No. 3, May/Jun. 1987, pp. 474–480.

Rolf Hagedorn et al, "Traveling–wave Dielectrophoresis of Microparticles", Electrophoresis no month available 1992, vol. 13, pp. 49–54.

(List continued on next page.)

*Primary Examiner*—Robert J. Warden
*Assistant Examiner*—John S. Starsiak, Jr.
*Attorney, Agent, or Firm*—Cushman Darby & Cushman IP Group of Pillsbury Madison & Sutro LLP

[57] ABSTRACT

The invention relates to a separator, which is particularly useful for separating cellular matter. The separator utilizes the phenomenon known as dielectrophoresis (DEP).

A DEP force effects a particle suspended in a medium. The particle experiences a force in an alternating electric field. The force is proportional to, amongst other things, the electrical properties of the supporting medium and the particle and the frequency of the electric field.

The separator, of the present invention, comprises a chamber (10) and a plurality of electrodes (12) disposed in the chamber (10).

An electric field established across electrodes subjects some of the particles to a stronger force than others such that they are confined within the chamber. Particles which are not confined are removed from the chamber by the supporting medium which is preferably urged through the chamber. Valves (101 and 202) are provided on exhausts of the chamber.

The invention is able to separate two different particles continuously.

23 Claims, 27 Drawing Sheets

U.S. PATENT DOCUMENTS

| | | | |
|---|---|---|---|
| 4,326,934 | 4/1982 | Pohl | 204/547 |
| 4,390,403 | 6/1983 | Batchlder | 204/547 |
| 4,441,972 | 4/1984 | Pohl | 435/172.2 |
| 4,534,856 | 8/1985 | Weiss et al. | 204/127.1 |
| 4,732,656 | 3/1988 | Hurd | 204/547 |
| 4,786,387 | 11/1988 | Whitlock | 204/547 |
| 4,900,414 | 2/1990 | Sibalis | 204/457 |
| 5,108,568 | 4/1992 | Van Alstire | 204/450 |
| 5,228,960 | 7/1993 | Liu et al. | 204/451 |
| 5,284,558 | 2/1994 | Linhardt et al. | 204/451 |
| 5,431,793 | 7/1995 | Wang et al. | 204/452 |
| 5,454,472 | 10/1995 | Benecke et al. | 204/127.1 |
| 5,489,506 | 2/1996 | Crane | 209/127.4 X |
| 5,653,859 | 8/1997 | Parton | 204/450 |

OTHER PUBLICATIONS

W.D. Geoghegan et al, "The Detection of Human B Lymphocytes by both Light and Electron Microscopy Utilizing Colloidal Gold Labeled Anti–Immunoglobulin", Immunological Communications, vol. 7(1), pp. 1–12 (1978) no month available.

Gascoyne et al: "Dielectrophoretic separation of mammalian cells studied by computerized image annalysis", Measurement Science & Technology, vol. 3, No. 5, May, 1991, pp. 439–440, cited in the application p. 1.

Washizu: "Electrostatic manipulation of biological objects", Journal of Electrostatics, vol. 25, No. 1, Jun. 1990, pp. 109–123, see p. 120, para 2—p. 121 para 2.

APPARATUS FOR SEPARATING BY DIELECTROPHORESIS

FIELD OF THE INVENTION

This invention relates to improvements in separators and more particularly to improvements in dielectrophoretic separators.

BACKGROUND OF THE INVENTION

Dielectrophoretic (DEP) separators rely on the phenomenon that substances within a non uniform DC or AC electric field experience a dielectrophoretic (DEP) force. The (DEP) force causes the substance, which may gaseous, liquid, solid, or dissolved in solution, to move within the field.

A DEP field can have different effects upon different substances. This effect has been used to filter or separate substances, usually solids in suspension, from a liquid for the purposes of analysis.

A study carried out by Gascoyne, Huang et al. and reported in "Meas. Sci. Technol. 3 (1992), at pages 439 to 445", describes the separation of mixed population of mammalian cells and more particularly the separation of leukaemic cells from normal blood cells. However, separation was only achieved locally on electrodes.

A further study by Pethig, Huang et al. in J. Phys. D Appl. Phys. 24 (1992) 881 to 888 describes an arrangement for positive and negative dielectrophoretic collection of colloidal particles using interdigitated, castellated microelectrodes. The arrangement described enables a colloidal suspension to be separated locally. However, permanent separation of a colloid from the liquid in which it was suspended was not possible.

U.S. Pat. No. 4,390,403 (Batchelder) describes and claims an arrangement for filtering a species from a liquid. This describes a method which employs DC non-uniform electrical fields to manipulate one or more chemicals within a multi-electrode chamber so as to promote chemical reactions between the chemical species.

German Offenlegungsschrift DE-A-4127405 purports to describe an arrangement for continuous separation of microscopic particles. It is stated that the arrangement overcomes the problem of convectional drift within a separator. The arrangement allegedly overcomes this problem by applying a high frequency, electric travelling wave between rows of electrodes, which themselves are positioned between two additional electrodes which are electrically isolated from the aforementioned rows of electrodes. The two additional electrodes (5 and 6 in FIG. 1) of that document are arranged substantially parallel to one another. The description of the aforementioned Offenlegungsschrift refers to "an additional force field" which exists because of an electrophoretic effect upon the particles. Electrophoresis relies upon particles being charged. The present invention utilises DEP only. Other examples of forces are mentioned. However, the disclosure is considered not to be sufficiently clear and complete to be an enabling, in respect of these.

SUMMARY OF THE INVENTION

The present invention arose from a consideration of the problem of permanent separation of two substances, which may be in suspension in a fluid, which may be a liquid.

According to a first aspect of the present invention there is provided apparatus for separating first and second particles from a fluid comprising:

i) a first group and a second group of electrodes, which in use are disposed in the path of the fluid supporting the first and second particles, such that the fluid may flow over the electrodes, the electrodes being adapted to be placed in a filter chamber;

ii) the filter chamber having an inlet and at least one outlet;

iii) means for establishing a dielectrophoretic (DEP) field between the first and second groups of electrodes;

iv) the DEP field between the electrodes causing a resultant force to be experienced by the particles, such that the first particles are confined; and v) means for selectively removing the second particles from the chamber.

Preferably control means is provided for establishing the dielectrophoretic field and for activating the means for selectively removing the second particles from the chamber.

Preferably the control means comprises means for synchronizing one or more valves located at the or each outlet of the filter chamber, arranged to permit fluid to exhaust from the chamber, with a respective fluid pressurizing means.

Variation of the effect of the field is preferably achieved by varying the frequency of a signal applied across the electrodes. Different frequencies may be imposed simultaneously across different groups or sub-groups of electrodes.

A fluid pressurizing arrangement, which may be a pump, pressure source syringe or even a gravity feed, may be used, in conjunction with the apparatus for causing or permitting the second particle to be urged towards a second outlet of the chamber.

The fluid pressurizing arrangement preferably comprises one or more pumps. Advantageously a pump is provided for each outlet of the chamber. Most preferably the or each valve is associated with one or more pumps, such that the synchronization means establishes a first dielectrophoretic field for confining the first particles and simultaneously opens a valve on an outlet of the chamber and causes the pressure of the interior of the chamber to exceed the pressure exterior of the chamber. The result is that the second particles are exhausted from the chamber. The control means then closes the valve and may allow the pressure of the interior of the chamber to return to that pressure exterior of the chamber. Subsequently, or simultaneously, the control means then switches off the dielectrophoretic field which confines the first particle. The control means then activates a second valve and pressurizing means to urge first particles towards an outlet, which is preferably a different outlet than the outlet through which the second particles are exhausted. The first particles are then exhausted from the chamber. The control means then repeats the sequence in a cyclic manner. The control means may open a valve to achieve pressurization within the chamber or it may activate a pump.

The invention differs over the arrangement described in DE-A-4127405 in that a so called travelling wave is not generated. That is, there is no sequential or cyclic switching between adjacent electrodes or sets of electrodes. Separation is achieved by the combined effects of confinement by the DEP field followed by pumping of the supporting medium.

The chamber may be oriented in such a way that the second particles are removed from the chamber under the influence of gravity. The first particles may be removed from the chamber after all of the second particles have been removed. This may be via the same outlet. However, the first particles are preferably removed via a different outlet. A separate fluid pressurizing arrangement may be used to assist removal of the first particles.

The first and second groups of electrodes may be subdivided into sub-groups, such that, for example there may be several pairs of separate electrodes. Selective switching of these sub-groups of electrodes includes cyclic switching of adjacent pairs of sub-groups of electrodes. These pairs may overlap so that a second member of a pair at one switching step becomes the first member of a different pair in a subsequent switching step.

Preferably the first particles are moved relative to the or each electrode by the fluid in which they are supported.

It is understood that the term "switching" includes: varying the potential difference between adjacent electrodes and/or sub-groups of electrodes; and/or varying the current passing through the fluid, which is usually a liquid, between adjacent electrodes or sub-groups of electrodes and/or varying the frequency of the voltage and/or current.

In particular it is preferred to vary the frequency of the voltage as it has been discovered that variation of the frequency of the voltage gives rise to different dielectrophoretic forces upon different substances. That is to say, two different substances A and B supported in suspension in a liquid behave quite differently and experience different magnitudes of dielectrophoretic force depending upon the frequency of application of the DEP field in which the particles are situated.

Furthermore by arranging, in series, at least one frequency generator, connected to adjacent sub-groups of electrodes, it is possible to cyclically switch electrodes in order to selectively attract and/or confine one or both substances A or B in different regions at different time intervals. One or more pumps may be used in combination with this arrangement. The result is that a "sweeping" effect is achieved whereby a first particle is urged towards a particular outlet of the chamber whilst the second particle is/are held within a DEP field. Such an arrangement may be used to separate one particle or substance from a mixture of two or more particles or substances.

Electrodes can have a longitudinal cross section which is regular and may be triangular, sinusoidal, sawtooth or square in shape. Preferably adjacent electrodes are interdigitated and are of a square, castellated cross section. Electrodes may be easily envisaged as having a transverse periphery which is in the form of a regular square wave, castellated profile. Selective switching and variation of the dielectrophoretic field between opposite (adjacent) electrodes is such as to cause spatial partitioning of substances around different regions of electrodes. Electrodes are preferably interdigitated.

Certain forms of live cellular matter experience a different DEP force to that experienced by the same type of dead cellular matter. Similarly, normal and cancerous cells may experience different DEP forces in the same DEP field. The magnitude of the DEP force depends upon physical characteristics of cellular structures such as: concentration and mobility of the ionic components. It has also been observed that different forms of proteins and chromosomes experience different DEP forces and the invention may be used to separate these.

By way of example only and for purposes of clarity, for the remainder of the specification live cellular matter will be referred to as particle 8 or type B and dead cellular matter will be referred to as particle A or type A. It will be understood that types A and B are analogous to the first and second types if particle referred to above. The aforementioned spatial separation, in one particular embodiment of the invention, causes cellular matter of the particle type A to accumulate about portions of a surface of castellated interdigitated electrodes which are generally within "troughs"; that is between digits of the same electrode and on top of electrodes, and for cellular matter of particle type B to accumulate between "peaks" of opposite (adjacent) electrodes. These accumulations have been compared with "triangles" or "diamonds" and "pearl chains" respectively. In one arrangement the cellular matter type A making up the "triangles", or "diamonds" which accumulate around the "troughs" of electrodes, and on top of electrodes, has experienced a generally weaker attraction towards that portion of the electrode surface than the other cellular matter type B has been attracted to its respective portion of electrode. The reason for this is because of the spatial distribution of the magnitude of the dielectrophoretic forces induced on the two types of particles and whether the particles are experiencing positive or negative dielectrophoresis. This is described in more detail below and with reference to the section entitled "theory".

A useful analogy to help visualize the aforementioned spatial distribution of DEP forces around an electrode, is to envisage a three dimensional graph showing diagrammatically an overall view of spatial distribution of DEP forces across the surface of a single electrode. The surface of the electrode is projected in the x-y plane. The magnitude of the dielectrophoretic (DEP) field experienced at a point in that plane, is shown on the z-axis. Such a surface is useful in envisaging the relative potential energies which are possessed by particles A and B. The surface can be seen to define regions of "hills" and deep and shallow "valleys". This is described below with reference to some of the Figures.

If particles A and B are visualized as spheres of the same volume their relative attractive/repulsive forces to the respective portions of electrodes are proportional to the heights of the "hills" and depths of the "valleys" from the plane z=o. As any system will tend to try to exist in its lowest energy state it will be appreciated that type B cells may experience greater DEP forces, i.e. they are held "tighter" within deeper DEP "valleys" than are type A cells. Some spheres will tend to accumulate easily and quickly within a deep sided "valley" and are less likely to be dislodged therefrom. For example by a solution flowing over the electrode surface. Other spheres however, will accumulate in a relatively shallow valley and may be dislodged relatively easily therefrom.

According to a second aspect of the present invention there is provided an electrode for use in the apparatus for separating the first and second particles from a fluid comprising: an electrical contact for connection to an electrical energy source which is controlled to change its polarity; and a surface, adapted for use in the filter chamber.

Preferably the electrode is at least coated or formed from an electrically conductive substance such as gold or platinum. However, other suitably inert metals, such as noble metals or even inert non-metals may be used.

According to a further aspect of the present invention there is provided a method for selectively separating first and second type particles from a fluid comprising the steps of:

i) passing the fluid containing the particles over surfaces of at least two electrodes;

ii) arranging the electrodes in such a manner that a dielectrophoretic field established between electrodes is capable of confining particles of the first type to a greater extent than particles of the second type; and thereby iii) causing or permitting particles of the second type to move relative to particles of the first type such that particles of the second type are separated from particles of the first type.

By providing one or more outlets to a filter chamber (within which the electrodes are placed), it is possible to remove fluid via a first outlet, which fluid is depleted in the first type (A) particle. Fluid may be removed from a second outlet which is depleted in the second type (B) particle.

Separation of the first and second type particles from the fluid is enhanced by switching dielectrophoretic fields between adjacent electrodes and selective pumping such that movement of the first type particles occurs in one direction whilst movement of the second type particles occurs in a different direction. These directions are preferably in the direction of the respective outlets and are in opposite senses. Removal of the or each type of particle is enhanced by employing a pump, syringe or other pressurising apparatus and urging the supporting fluid in one or both of the desired directions. The chamber may be oriented in such a way that particles are urged in the desired direction by gravity.

BRIEF DESCRIPTION OF THE DRAWINGS

Embodiments of, and methods of performing, the invention, will now be described, by way of example only, and with reference to the Figures in which:

FIG. 13*a* shows the beginning of a separation cycle, the DEP field is energised;

FIG. 13*b* shows particles of type A being moved to the left by fluid flow while the DEP field strongly holds particles of type B;

FIG. 13*c* shows the DEP field switched off and all particles are moved to the right by fluid flow;

FIG. 13*d* shows the dielectrophoretic field is re-established, particles of type A are moved to the left, while particles of type B are strongly held;

DETAILED DESCRIPTION OF PREFERRED EMBODIMENTS

A brief discussion of the theory will now be described with reference to FIGS. 1 to 10 inclusive.

Theory

Figure 1:
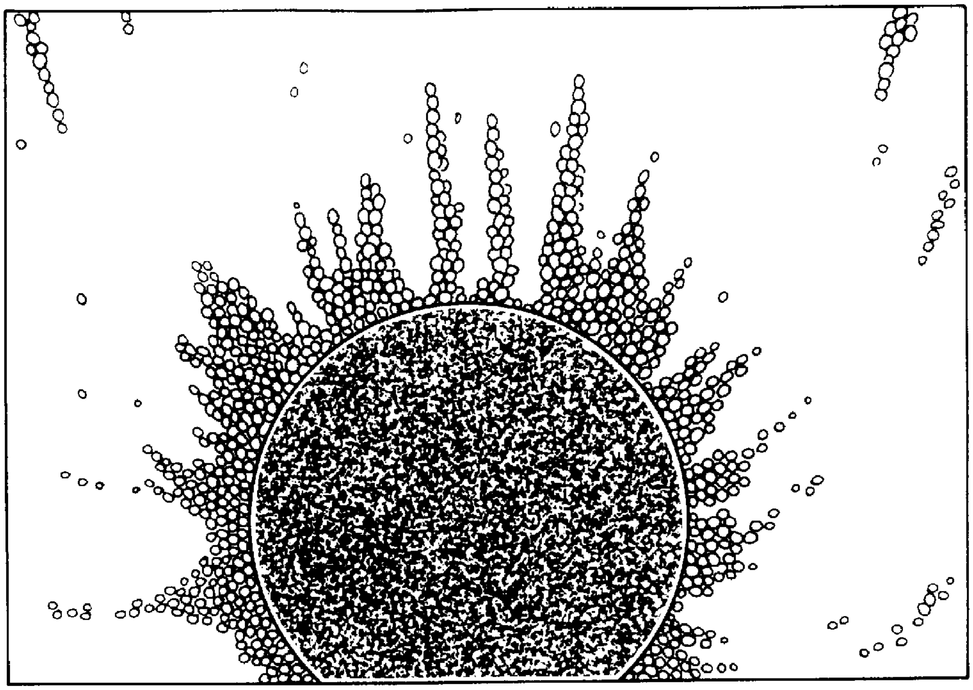
FIG. 1 shows viable yeast cells, suspended in 280 mM mannitol of conductivity 40 $mS.m^{-1}$ collecting at an electrode under positive dielectrophoresis for an applied voltage frequency of 10 MHz.

The basic theory and practice of using dielectrophoresis for the selective immobilization of bioparticles at an electrode has been available for more than 15 years, Pohl H. A. (1978) Dielectrophoresis Cambridge University Press (Cambridge). Positive dielectrophoresis is employed, where the particles are attracted to regions of electric field maxima at electrode surfaces, as shown in FIG. 1. Although isolated field maxima cannot occur away from electrodes, Jones T. B. and Bliss G. W. (1977) J. Appl. Phys. 48 1412-17, it is possible to levitate particles in free space or liquids using electronic feedback to maintain a balance between gravitational and dielectrophoretic forces, Jones T. B. and Bliss G. W. (1977) J. Appl. Phys. 48 1412-17, Jones T. B. and Kraybill J. P. (1986) J. Appl. Phys. 60 1247-52, Kaler K. V. I. S. and Jones T. B. (1990) Biophys. J. 57 173-82, Kaler K. V. I. S, Xie J-P, Jones T. B. and Paul R. (1992) Biophys. J. 63 58-69.

Figure 2:
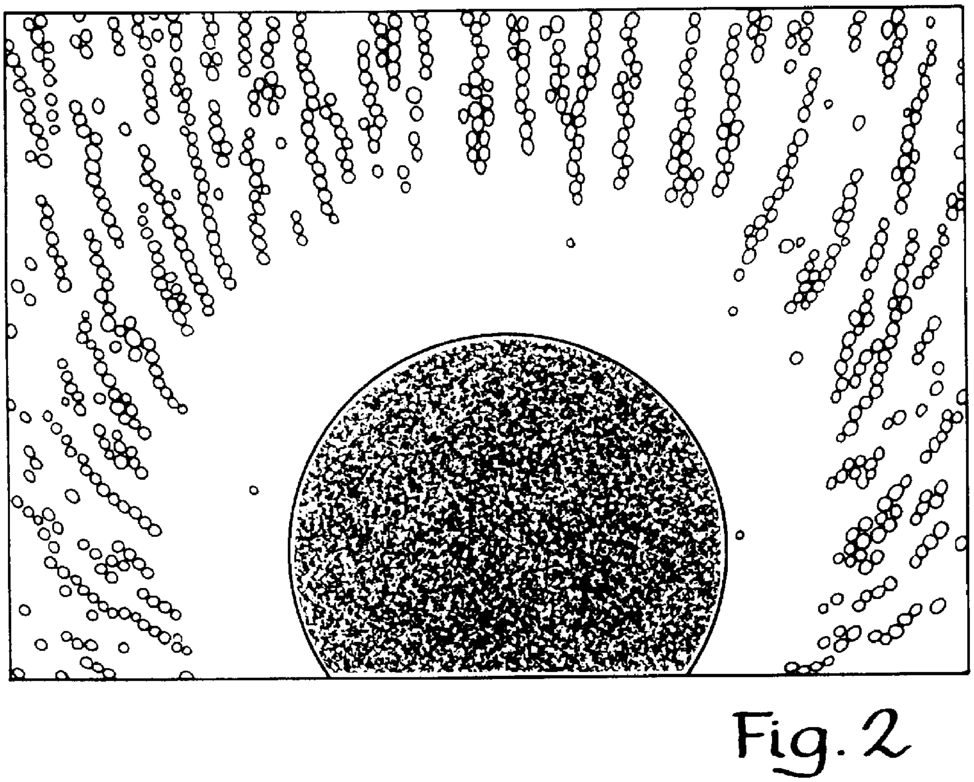
FIG. 2 shows viable yeast cells, suspended in the same mannitol solution, being repelled from the electrode under negative dielectrophoresis for an applied voltage frequency of 10 kHz.

Negative dielectrophoresis can be employed to confine particles in stable positions away from electrode structures. In this case particles are induced to move away from high field regions as shown in FIG. 2. By suitable choice of electrode geometry it is possible to define the locations of the electric field minima towards which the particles are directed and eventually confined, Huang Y. and Pethig R. (1991) Meas. Sci. Technol. 2 1142-46, Pethig R, Huang Y, Wang X-B and Burt J. P. H. (1992) J. Phys. D: Appl. Phys. 25 881-8, Gascoyne P. R. C, Huang Y, Pethig R, Vykoukal J. and Becker F. F. (1992) Meas. Sci. Technol. 3 439-45. Thus, by using both polarities of dielectrophoretic forces, it is possible to manipulate and entrap microscopic particles to a degree that depends on the potential energy profiles associated with both electric field maxima and minima.

Procedures are described for deriving the depths and profiles of the potential energy "wells" or "valleys" into which particles may be directed using positive and negative dielectrophoretic forces generated by microelectrodes of polynomial and castellated geometry. The results obtained are verified using test bioparticles (yeast, bacteria and blood cells) and demonstrations are presented of how such bioparticles may be selectively confined and released from the energy wells, according to cell type or viability.

Experimental Details

Materials

Yeast cells of *Saccharomyces cerevisiae* (strain R XII, obtained from the Institute of Biophysics, Free University of Berlin) were grown at 30° C. in a medium of pH 5 containing 5% sucrose (Sigma), 0.5% yeast extract (Oxoid) and 0.5% bacteriological peptone (Oxoid). The cells were harvested at around 18 hours in their growth phase and washed three times in 280 mM mannitol. Suspensions were made in 280 mM mannitol to which sufficient NaCl had been added to raise the conductivity to 40 $mS.m^{-1}$, as determined at 50 kHz using platinum-black electrodes and a HEWLETT PACKARD (Trade Mark) 4192A impedance analyser. Heat-treated cell suspensions were also prepared by heating at 75° C. for ten minutes and washing them in the same way as the viable cells. On staining with methylene blue, Stoicheva N. G, Davey C. L, Markx G. H. and Kell D. B. (1989) Biocatalysis 3 245-55, this heat treatment was found to result in a majority (over 95%) of the cells becoming non-viable. Suspensions with roughly equal amounts of viable and non-viable cells were made by mixing in 280 mM mannitol, and the conductivity of such suspensions was adjusted to 1 $mS.m^{-1}$ with NaCl.

Sheep blood was collected, and stored at 4° C., in a sterile vacutainer (Becton Dickinson, Oxford) containing lithium heparin as an anticoagulant. Erythrocytes were obtained by centrifuging the blood at 100 g for 5 minutes, and they were washed three times in 320 mM sucrose plus 3 $mg.ml^{-1}$ glucose solution. The cells were then suspended in similar sucrose+glucose solution, whose conductivity had been adjusted to 10 $mS.m^{-1}$ using NaCl.

*Micrococcus luteus* (syn. *M. lysodeikticus*) bacteria, Fleming strain 2665 obtained from the Bakh Institute of Biochemistry, Moscow, were grown in nutrient broth (Oxoid) at 30° C. and harvested by centrifugation at 100 g for 5 minutes. The cells were then washed three times and finally resuspended as for the erythrocytes in 10 $mS.m^{-1}$ sucrose+glucose solution.

Electrodes

Figure 3:
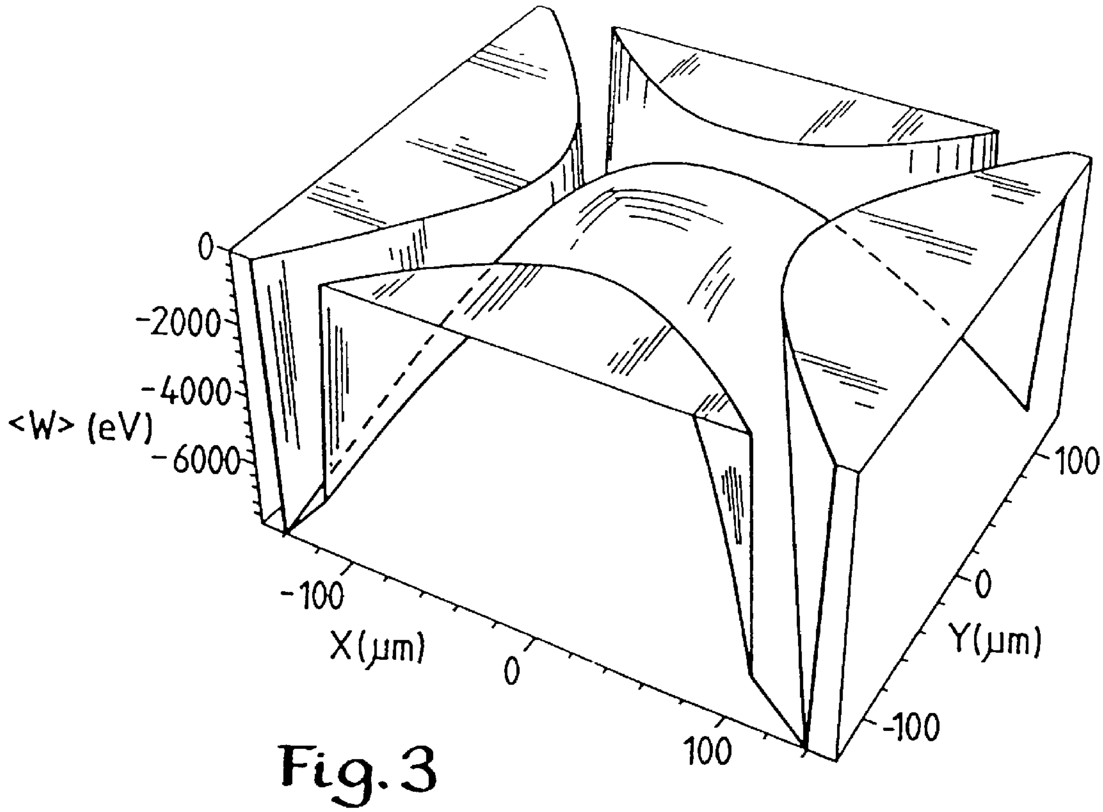
FIG. 3 shows the time-averaged potential energy profile for a 3 $\mu$m radius particle suspended in an aqueous medium and experiencing positive dielectrophoresis.
Figure 4:
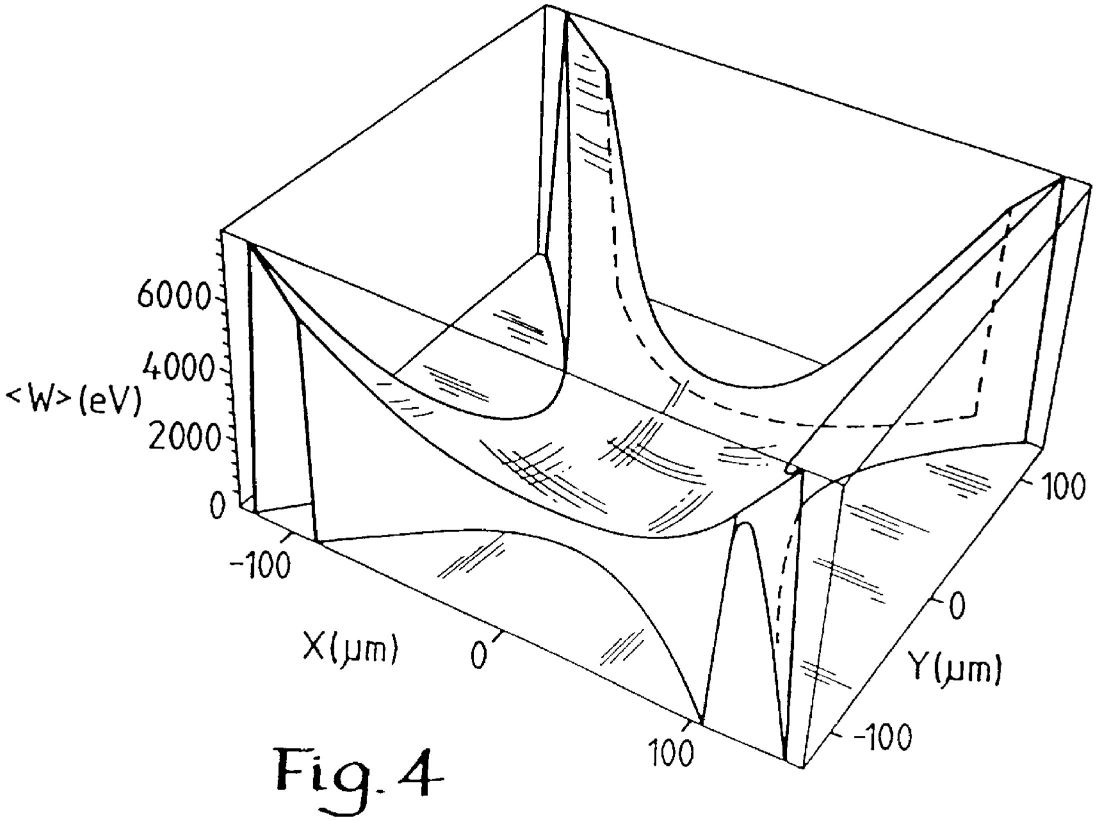
FIG. 4 shows the potential energy profile for the same particle in which it experiences negative dielectrophoresis.

Microelectrodes of polynomial geometry, Huang Y. and Pethig R. (1991) Meas. Sci. Technol. 2 1142-46, and interdigitated, castellated, Pethig R, Huang Y, Hang X-B and Burt J. P. H. (1992) J. Phys. D: Appl. Phys. 25 881-8, Price J. A. R, Burt J. P. H. and Pethig R. (1988) Biochim, Biophys. Acta 964 221-30, were produced using photolithographic techniques described elsewhere, Price J. A. R, Burt J. P. H. and Pethig R. (1988) Biochim, Biophys. Acta 964 221-30. These electrode types are shown in FIGS. 3 and 4; and 5 respectively, and were used to demonstrate the selective trapping and release of viable and non-viable yeast cells, erythrocytes and bacteria using both positive and negative dielectrophoresis. Electrodes of pin-plate geometry were also constructed, and these were used to determine unambiguously (see FIG. 1) the polarity of the dielectrophoretic effect exhibited by the cells as a function of the electric field frequency and suspending medium conductivity.

Potential Energy

As first described by Maxwell J. C. (1891) A Treatise on Electricity and Magnetism, 3rd ed. Vol.1, Ch.ix, Clarendon Press, Oxford, when an external electric field is applied to a system consisting of a particle suspended in a dielectric medium, charges are induced to appear at the particle-medium interface so as to lend to this polarized particle the properties of an electric dipole. The corresponding potential energy of the system is given by:

$$W=-m\cdot E \qquad \text{Eqn. (1)}$$

where m is the induced effective dipole moment and E is the applied field. In this work we will restrict ourselves to interaction of the induced dipole moment and the non-uniform external field, since the effect of induced multipoles becomes dominant only in regions where the field is zero, Washizu M. (1992) J. Electrostatics 29 177-88.

For a spherical particle of radius r, absolute complex permittivity $\epsilon^*_p$ ($\epsilon^*_p=\epsilon_p-j\sigma_p/\omega$, where $\sigma$ is the conductivity and $j=\sqrt{-1}$ ) suspended in a medium of absolute complex permittivity $\epsilon^*_m$ and subjected to an A.C. electric field $E(x,y,z)\cos\omega t\ a_z$ of radian frequency $\omega$, the induced dipole moment is given, Huang Y, Hölzel R, Pethig R. and Hang X-B (1992) Phys. Med. Biol. 37 1499-1517, by:

$$m = 4\pi\,\epsilon_m\, r^3(Re[f(\epsilon_p, \epsilon^*_m)]\cos\omega t - Im[f(\epsilon^*_p, \epsilon^*_m)]\sin\omega t)E(x, y, z)a_z \qquad \text{Eqn. (2)}$$

where Re and Im refer to the real and imaginary components, respectively, of the Clausius-Mossotti factor $f(\epsilon^*_p,\epsilon^*_m)$ defined by:

$$f(\epsilon^*_p, \epsilon^*_m) = \frac{\epsilon^*_p - \epsilon^*_m}{\epsilon^*_p + 2\epsilon^*_m} \quad \text{Eqn. (3)}$$

Integrating equation (2) over times much longer than the period $(2\pi/\omega)$ of the applied field, then from equation (2) the time-averaged potential energy of the polarized particle is:

$$\langle W\rangle = -2\pi\epsilon_m r^3 Re[f(\epsilon^*_p, \epsilon^*_m)]\, E^2(\text{rms}) \quad \text{Eqn. (4)}$$

The dielectrophoretic force acting on the particle is given, Huang Y, Hölzel R, Pethig R. and Wang X-B (1992) Phys. Med. Biol. 37 1499–1517, by $$F(\omega) = 2\pi\epsilon_m r^3 Re[f(\epsilon^*_p, \epsilon^*_m)]\, \nabla E^2(\text{rms}) \quad \text{Eqn. (5)}$$

so that $$F(\omega) = -\nabla \langle W\rangle \quad \text{Eqn. (6)}$$

which indicates that the dielectrophoretic force directs the particle to a region where its electrical potential energy is a minimum. Thus, for a particle which is more polarizable than its suspending medium, corresponding to a positive value for the factor $Re[f(\epsilon^*_p, \epsilon^*_m)]$, the particle will experience positive dielectrophoresis and be directed to a location where the local electric field ($E^2$) is a maximum. From equation (2) this situation can also be understood to occur at those frequencies where the magnitude of the phase difference $\phi$ between the applied field and the induced dipole moment is less than 90°. Conversely, a particle of sufficiently low polarizability to have a negative value for $Re[f(\epsilon^*_p, \epsilon^*_m)]$ (so that $|\phi| > 90°$) will possess a minimum potential energy when directed to a local field minimum.

Thus, for selective dielectrophoretic manipulation and confinement of particles the important parameters to control are the electric field distribution ($E$, $\nabla E^2$) and the factor $Re[f(\epsilon^*_p, \epsilon^*_m)]$. The field distribution is determined by the electrode geometry, whilst $Re[f(\epsilon^*_p, \epsilon^*_m)]$ varies with frequency according to the dielectric properties ($\epsilon^*_p$) and ($\epsilon^*_m$) of the particle and surrounding medium, respectively. For mixtures of particles of differing dielectric properties, selective manipulation can be achieved through suitable modification of the conductivity or relative permittivity of the suspending medium, whilst for particles of similar dielectric properties selectivity can be achieved using highly specific chemical treatments or attachments (eg antibody-antigen reactions) that change the dielectric properties of one or more of the particle types.

Polynomial Electrodes

The basic polynomial electrode shape is shown in FIG. 3 and was designed, Huang Y. and Pethig R. (1991) Meas. Sci. Technol. 2 1142-46, to provide a well defined spatial variation of the electric field. The polynomials defining the electric potential are derived from Laplace's equations and are of the form $$f_n(x,y) = af_{na} + bf_{nb}$$

where n defines the number of electrode pairs. Further details are provided by Huang and Pethig as mentioned above and it is sufficient to state that for the n=2 polynomial design of FIG. 3 the spatial variation of the field in the inter-electrode space is given by $$|E| = \frac{V_2 - V_1}{d^2}\,(x^2 + y^2)0.5 \quad \text{Eqn. (7)}$$

where d is the radial distance between the centre of symmetry and an electrode tip, and $V_1$ and $V_2$ are the potentials applied to opposing electrodes. Thus, from equation (4), for an applied sinusoidal voltage V the time-averaged potential energy of a particle suspended within the polynomial geometry is given by $$\langle W\rangle = -2\pi\, \epsilon_m\, r^3\, Re[f(\epsilon^*_p, \epsilon^*_m)]\, \frac{V^2(\text{rms})}{d^4}\,(x^2 + y^2) \quad \text{Eqn. (8)}$$

Three-dimensional plots of <W> are shown in FIGS. 3 and 4 for the specific case of d=64 μm. a particle radius r of 3 μm suspended in aqueous media where $\epsilon_m = 80\, \epsilon_O$ and for an applied voltage of 5 V (rms). The potential energy profile shown in FIG. 3 corresponds to the case where the parameter $Re[f(\epsilon^*_p, \epsilon^*_m)]$ has a value of +0.2, so that the particle is trapped in a steep-sided energy well at the electrode edges under the influence of positive dielectrophoresis. In FIG. 4 the parameter $Re[f(\epsilon^*_p, \epsilon^*_m)]$ has a value of −0.2, and now the particle is directed into a potential energy well at the centre of the interelectrode space. Since the field is zero at the centre, Huang Y. and Pethig R. (1991) Meas. Scd. Technol. 2 1142-46, then <W> is also zero and can be taken as a reference point.

For a 3 μm radius particle initially suspended in aqueous medium at an electrode edge (eg x=64 μm, y=0) and for which $Re[f(\epsilon^*_p, \epsilon^*_m)]$ has a value of −0.2, then on application of a 5V (rms) voltage we find from equation (8) that the particle is directed into a potential energy well of relative depth 918 eV. In other words the particle has to overcome a potential energy barrier of at least 918 eV to escape the electrode system. From equation (6) the average dielectrophoretic force acting on such a particle, as it moves from the electrode edge to the center, can be calculated to be 2.3 pN.

Interdigitated Electrodes

Figure 5:
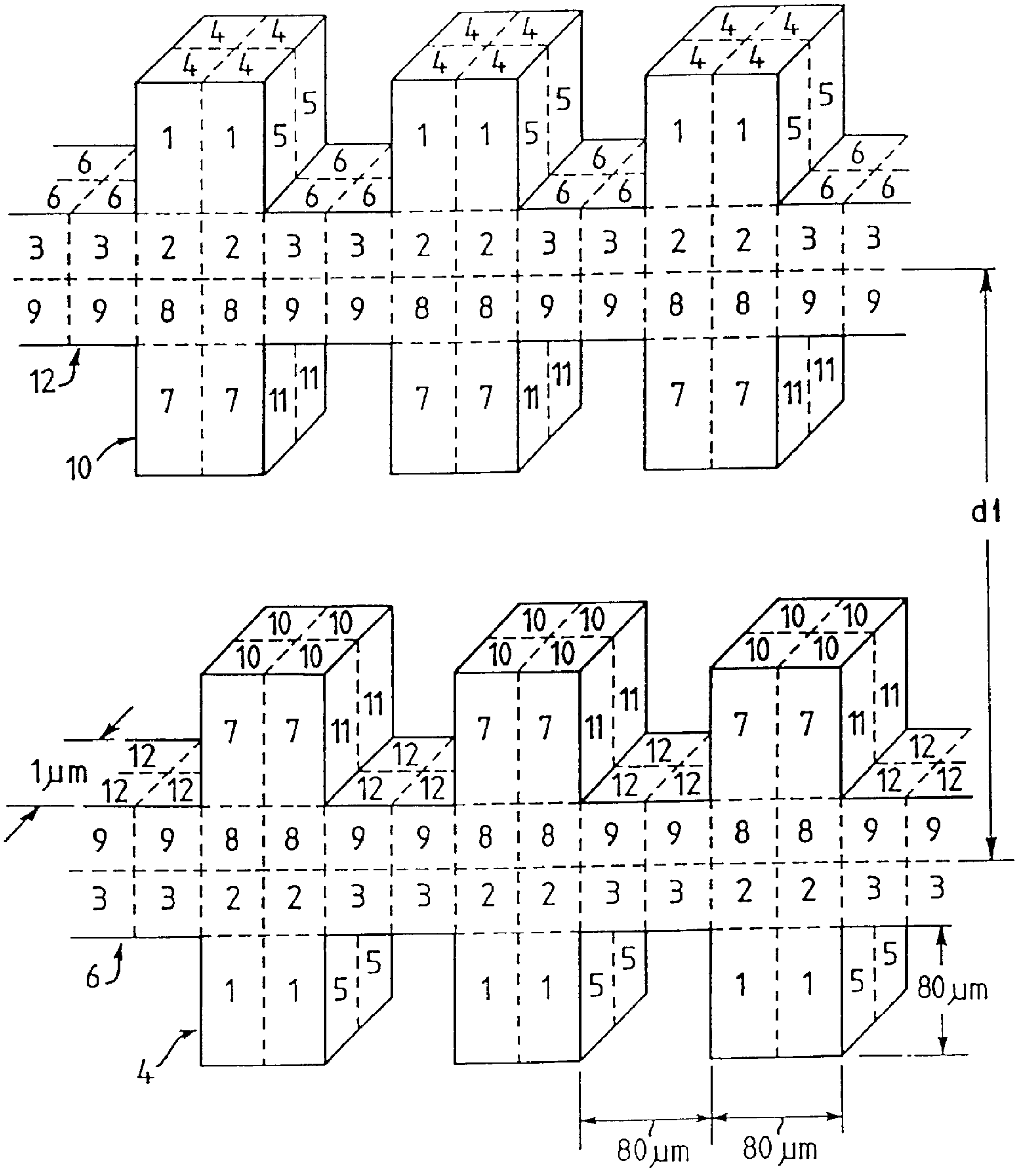
FIG. 5 shows an overall view of an electrode divided, for calculations of the surface charge density $\beta$, into 675 subareas contained within 12 elements.

The geometric form of the interdigitated, castellated electrodes is shown in FIG. 5. The dimensions (not to scale) of the electrodes are indicated. Charge interactions between the basic repeat structure and six neighbouring ones on either side of the same electrode and the adjacent one of opposite potential were taken into account. Details of the electrode are described by Pethig R, Huang Y, Wang X-B and Burt J. P. H. (1992) J. Phys. D: Appl. Phys. 25 881-8. To derive the potential energy profiles for such electrodes, numerical computations of the electric field distribution were made following the charge density method Martinez G. and Sancho M. (1983) Am. J. Phys. 51 170-4, Birtles A. B, Mayo B. J. and Bennett A. W. (1973) Proc. IEE 120, pp. 213–220, using a VAX (Trade Mark) computer and Fortran (VAX/VMS operation system).

The charge density method employs the following relationship between the potential V(r) and charge density distribution p(r') on the electrode surface S:

$$V(r) = \frac{1}{4\pi\epsilon_m} \int \frac{\rho(r')}{s|r - r'|}\, ds \quad \text{Eqn. (9)}$$

where $\epsilon_m$ is the absolute permittivity of the surrounding medium, and r and r' are any points over S, which can include more than one electrode. The solution of equation (9) to find the charge density function ρ(r') is facilitated by division of the electrodes into sub-areas of such sufficiently small size that their surface charge densities can be assumed uniform. Dividing S into n sub-areas $s_j$ (j=1,2, . . . n) of surface charge density $\rho_j$, eluation (9) then takes on the matrix form;

$$V(r_1) = \sum_{j=1}^{n} X_{ij}\rho_j \quad (i = 1, 2, \ldots n) \qquad \text{Eqn. (10)}$$

Here, $r_1$ is the geometrical centre of the sub-area $s_l$ and $X_{ij}$ is given by $$X_{ij} = \frac{1}{4\pi\epsilon_m} \int \frac{ds_j}{s|r_i - r_j|} \text{ (for } r_j \text{ over area } s_j) \qquad \text{Eqn. (11)}$$

From knowledge of the distribution of the sub-areas one can determine $X_{ij,}$ the potential at point $r_i$ due to unity charge density on sub-area $s_j$. The charge density $\rho_j$ over the whole electrode surface can then be calculated from the relationship $$\rho = X^{-1}V \qquad \text{Eqn. (12)}$$

where $\rho=[\rho_1\ \rho_2 \ldots \rho_n{}^{1'}$, $X_{ij}$, =1 ($X_{ij}$, =1, . . . n; j=1 . . . n), and $V=[V_1\ V_2 \ldots V_n 1'$is the known potential applied to the electrode. Having obtained the charge density $\rho_j$ (j=1, . . . n) the potential at any point $r_k$ is found by substituting $X_{ij}$ in equation (10) to give $$V(r_k) = \sum_{j=1}^{n} \left( \rho j \frac{1}{4\pi\epsilon_m} \int \frac{ds_j}{s_j|r_k - r_j|} \right) \qquad \text{Eqn. (13)}$$

Figure 6:
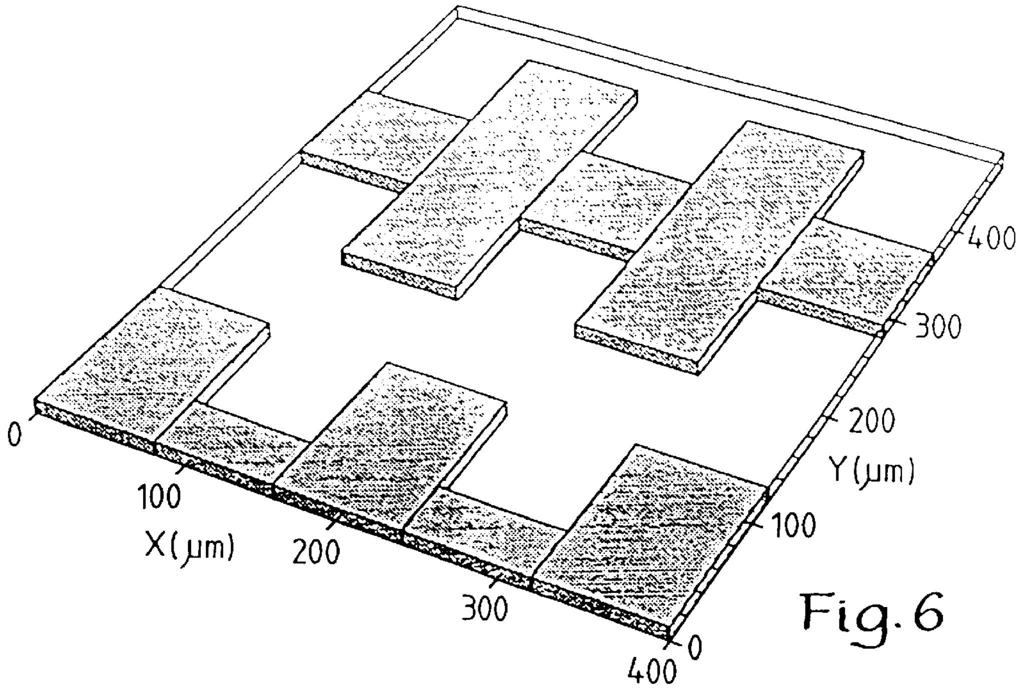
FIG. 6 shows an overall view of an interdigitated electrode.

The interdigitated electrode design consists of a periodic "castellation" structure shown in FIGS. 5 and 6. For the calculations of the surface charge density the basic repeat structure was divided into 675 rectangular sub-areas contained within elements 1–12 shown in FIG. 5. Although the charge distribution within the 12 elements of the basic repeat castellation structure might differ from each other the charge density on similar elements (ie identified by the same number) were assumed to be the same. The relative sizes of the elements and the number of sub-areas within them, were chosen on the basis of preliminary calculations of the surface charge distribution. Those regions (e.g. elements 7 and 10) of greatest charge density variation were allocated the largest number of sub-areas. Based on the assigned sub-division of the electrode surfaces, the potential coefficients ($X_{ij}$) were calculated using equation (11) and the procedure described by Reitan and Higgins [17]. In the process of calculating matrix X, collective charge-charge interactions between sub-areas, located at different parts of the same electrode, as well as with those of an adjacent electrode, were taken into account. For example, referring to FIG. 5, the electric potential at all sub-areas $s_{ij}$ in element 7 were calculated taking into account not only the charge densities occurring in the 675 sub-areas of the basic castellation unit, but also those occurring in elements 1–12 for the next 6 castellations on the left and right hand sides, as well as for those located on the adjacent electrode. The charge density distribution (675 values for the charge density at the 675 sub-areas) was then obtained using equation (12) for assumed electrode potentials of +1V and −1V applied to the (interdigitated) electrode pairs. An example of distance d1 shown in FIG. 5 is 320 μm.

From the derived charge density distribution, the electric potential distribution was obtained using equation (13). The field E (=−grad V) and the dielectrophoretic force factor $\nabla E^2$ were then derived for points uniformly distributed on a plane located 3.5 μm above the electrodes, and the resulting three-dimensional plots of the time-averaged potential energy <W>, derived using equation (4), are shown in FIG. 7 and 8.

Figure 7:
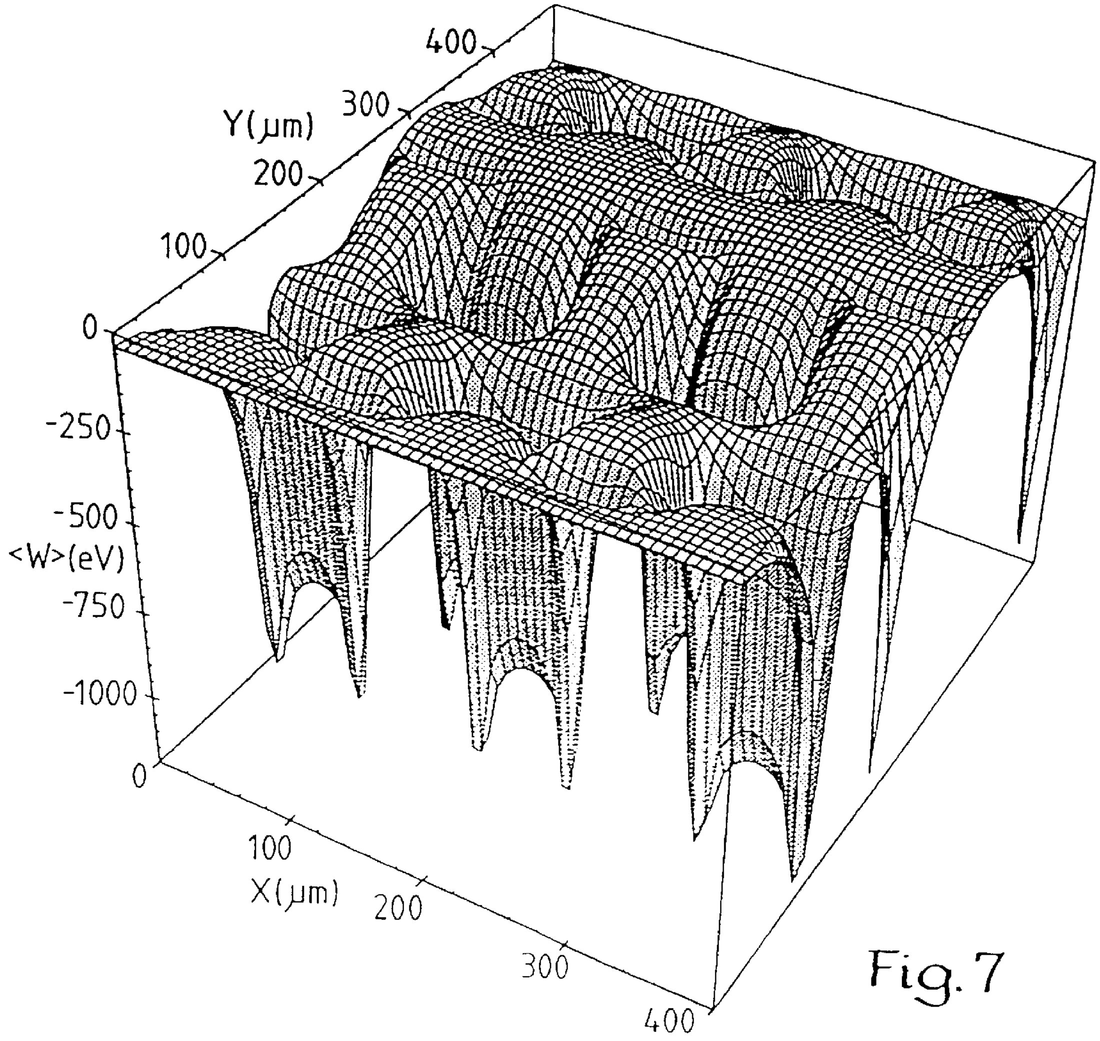
FIG. 7 shows a time-averaged potential energy profile for a 3 $\mu$m radius particle, suspended in aqueous medium located in a plane 3.5 $\mu$m above the electrode surface.
Figure 8:
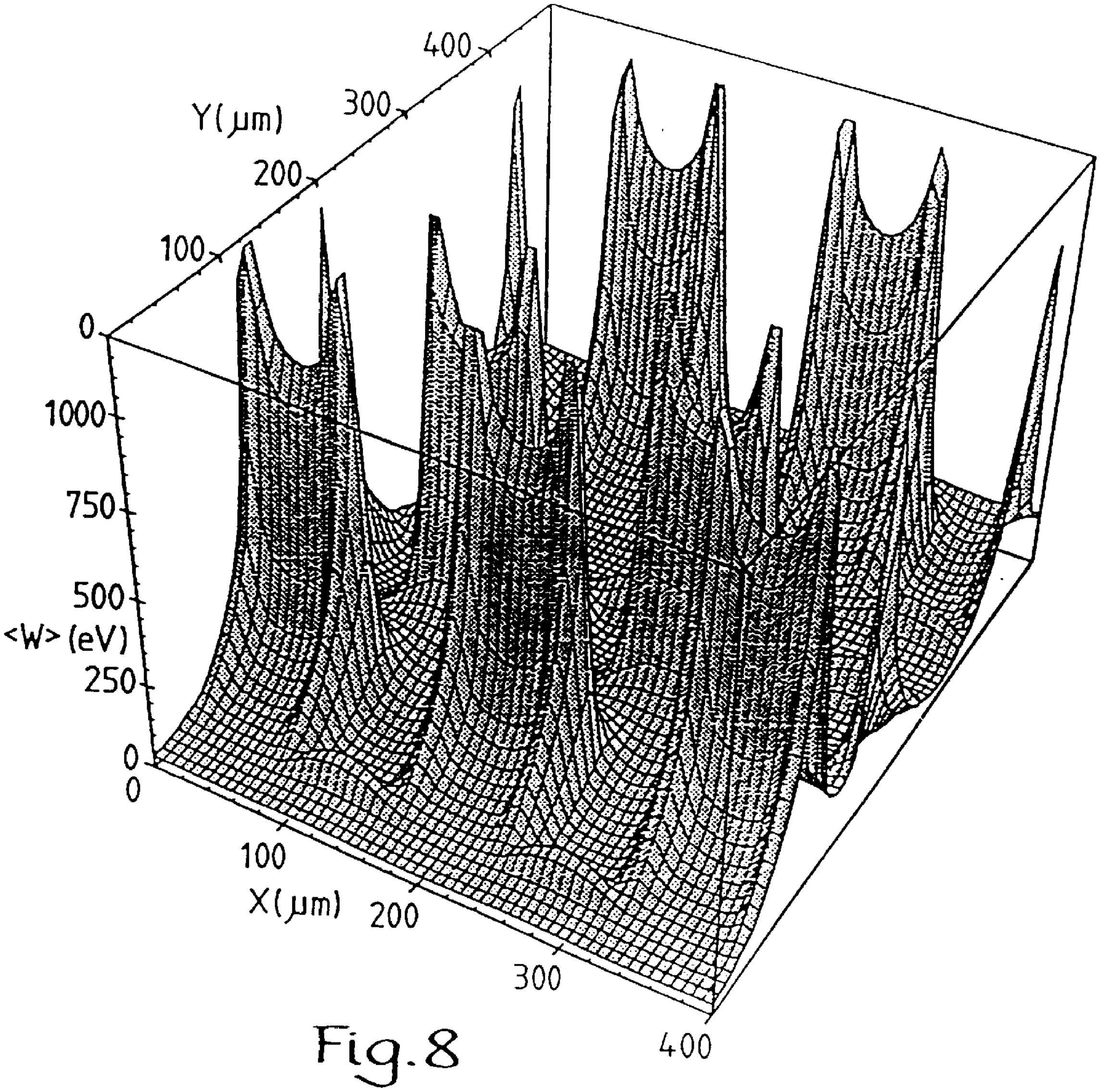
FIG. 8 shows the potential energy profile for the same particle and electrodes for the case of negative dielectrophoresis.

FIG. 7 depicts the situation for positive dielectrophoresis ($Re[f(\epsilon^*_p,\epsilon^*_m)]=+0.2$), whilst in FIG. 8 the potential energy profile for negative dielectrophoresis is shown ($Re[f(\epsilon^*_p,\epsilon^*_m)]=-0.2$). The other parameters used to derive these profiles are specified below. The relative change in the absorbance of the yeast suspension is measured after the application of A.C. voltages to the electrodes. From the Figures it can be seen that under a positive dielectrophoretic force particles are directed into potential energy traps at electrode edges, irrespective of their initial locations within the electrode structure. However, with negative dielectrophoresis, particles initially located in the inter-electrode space, are directed into energy wells in "bay" regions of electrodes, whilst those initially located above the electrode surfaces are directed onto the surfaces of "tips" of electrodes.

From the results of FIG. 7 it is also evident that by comparison with those confined in negative dielectrophoretic energy wells, particles trapped under positive dielectrophoresis must overcome large potential energy barriers in order to escape the electrode system. The particles experience a positive dielectrophoretic force ($Re[f(\epsilon^*_p,\epsilon^*_m)]=+0.2$) generated by interdigitated electrodes of characteristic dimension 80 μm. The applied voltage is 5V rms, and the X-Y coordinates are specified in terms of the shown electrode geometry. This can be appreciated more clearly with reference to FIGS. 8 and 9, which show how the potential energy profiles are modified on superimposing an extra force field (e.g gravity or fluid flow) onto the dielectrophoretic forces. Particles under the influence of a positive dielectrophoretic force will be retained within deep energy wells, whereas for those experiencing negative dielectrophoresis the barriers restricting their translational freedom over the electrode system are not very large.

Results and Discussion

From equations (3) and (4) it follows that, for a suspension consisting of two particle types, with careful choice of the suspending medium conductivity, it is possible at some frequency to attain the situation where the parameter $Re[f(\epsilon^*_p,\epsilon^*_m)]$ for each particle type is of opposite polarity. This suggests a useful application, namely the capability of separating the components of an heterogeneous suspension using dielectrophoretic forces. The following experiments were made to illustrate the feasibility of this.

Separation of viable and non-viable yeast cells using polynomial electrodes

Figure 17:
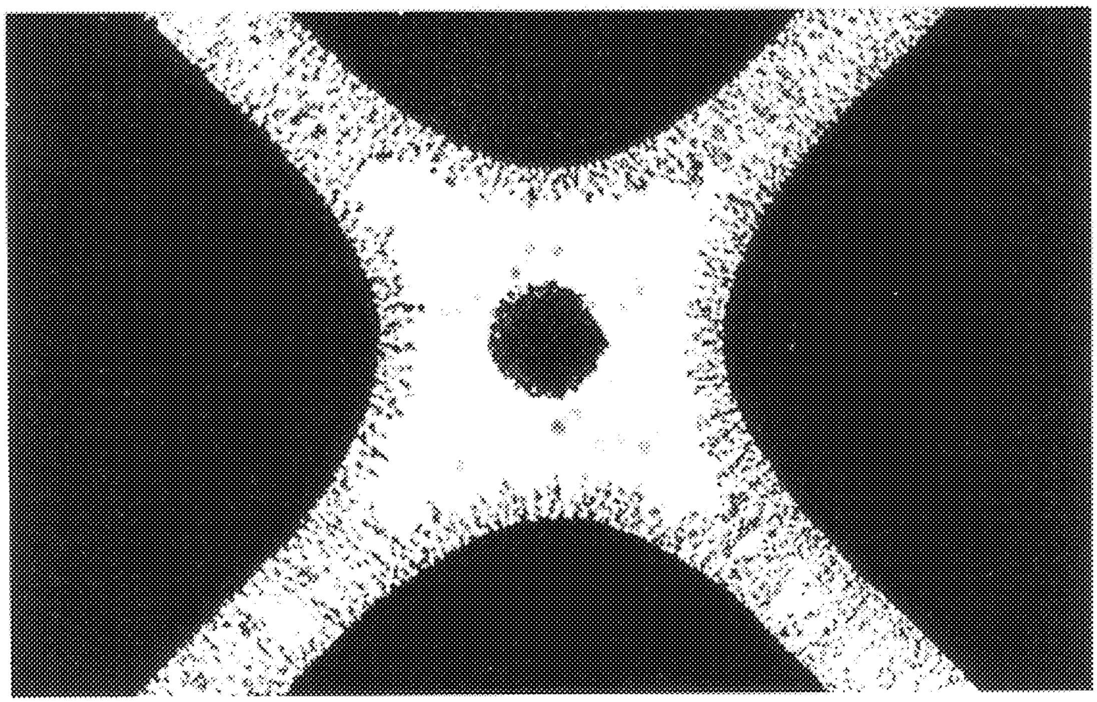
FIG. 17 is a view of a polynominal electrode, showing collection of viable cells along electrode edges under positive dielectrophoresis and non-viable cells in the center under negative dielectrophoresis.
Figure 18A:
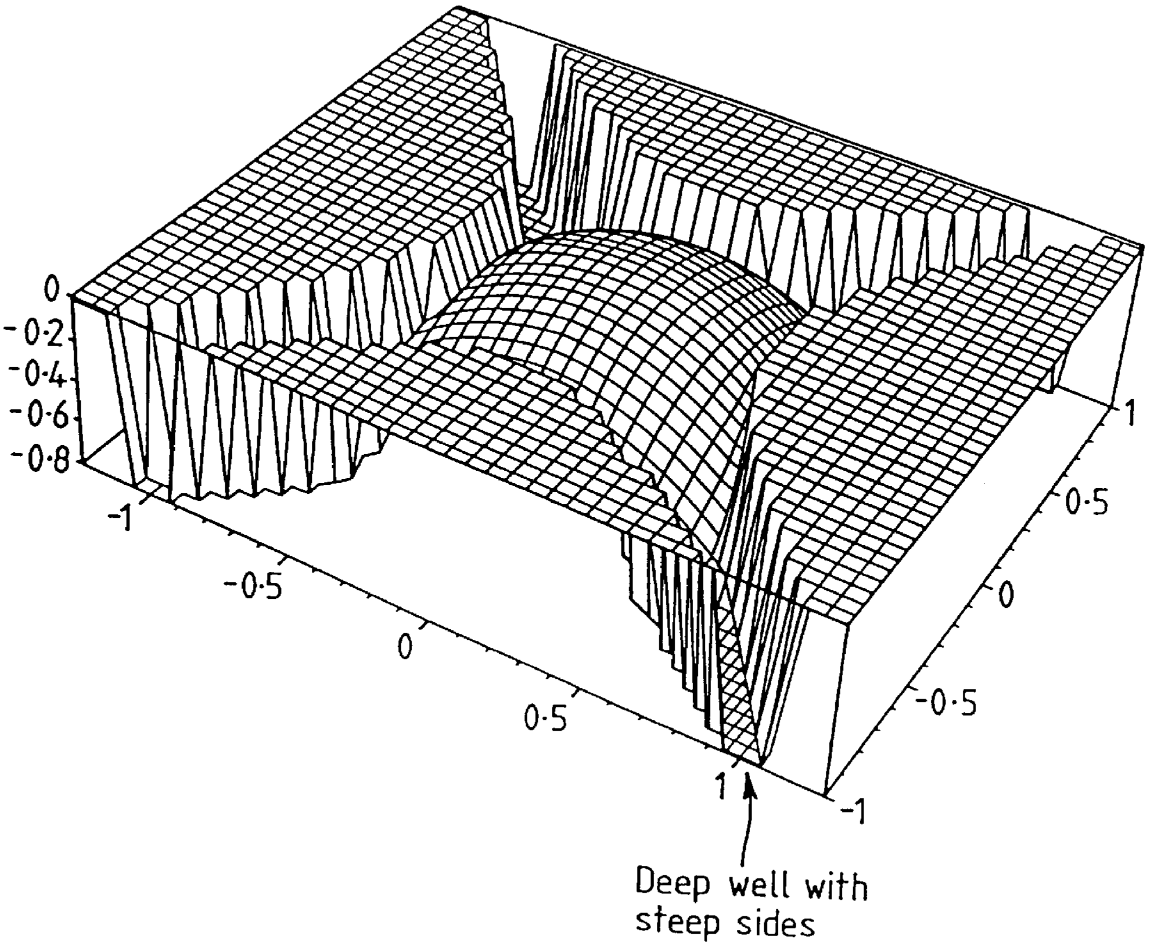
FIG. 18*a* shows a graph depicting a three dimensional surface representing a positive dielectrophoretic field potential between adjacent electrodes and corresponding to the arrangement in FIG. 17.
Figure 18B:
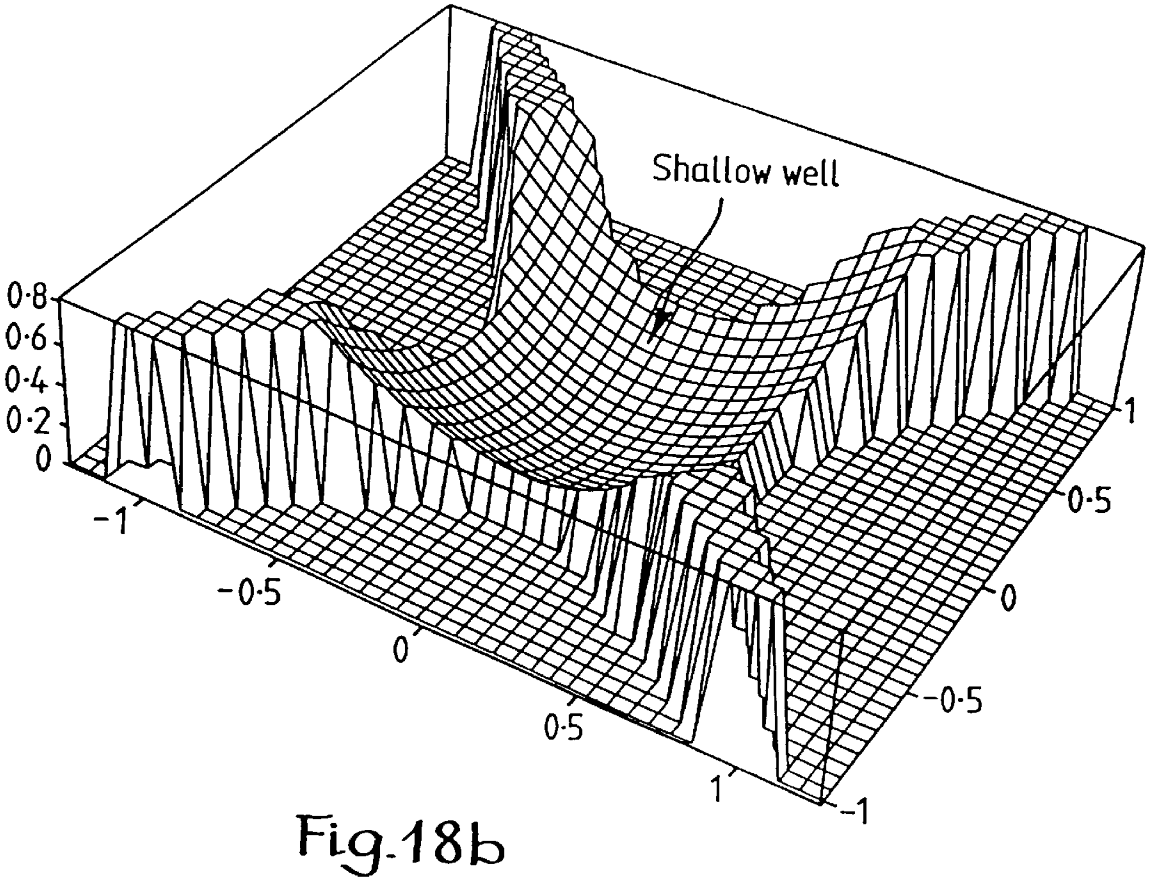
FIG. 18*b* shows a graph depicting a three dimensional surface representing negative dielectrophoretic field potential between electrodes in the arrangement of FIG. 17.

A 50 μl sample of a suspension of mixed viable and non-viable (heat-treated) yeast cells was pipetted onto a polynomial electrode structure of dimension 128 μm between opposite electrode tips. 10 seconds after applying a 10 MHz, 5 V (rms) signal to the electrodes the collection pattern shown in FIG. 17 was observed. From methylene blue staining tests and separate dielectrophoretic measurements on viable and non-viable cells using the pin electrode system of FIG. 1, it was concluded that the result shown in FIG. 17 depicts viable cells being collected at the electrode edges and non-viable ones being confined to the central inter-electrode region.

Thus, at a frequency of 10 MHz and in a suspending medium of conductivity 1 $mS.m^{-1}$, viable and non-viable yeast cells exhibit a positive and negative value, respectively, for the factor $Re[f(\epsilon^*_p,\epsilon^*_m)]$. This, in turn reflects differences in the dielectric properties of the cell wall, membrane and cell interior of a viable and non-viable yeast cell, as quantitatively described elsewhere (Huang Y, Hölzel R, Pethig R. and Wang X-B (1992) Phys. Med. Biol. 37 1499–1517). Cells exhibiting a positive $Re[f(\epsilon^*_p,\epsilon^*_m)]$ value are directed to the regions of greatest field intensity, whilst those of negative $Re[f(\epsilon^*_p,\epsilon^*_m)]$ become confined to the region of minimum $E^2$ value.

Separation of *Erythrocytes* and *Micrococcus luteus* using Interdiaitated electrodes Samples of the *erythrocyte* and *M. luteus* suspensions were mixed together and a 50 $\mu$l sample of this mixture was pipetted onto an interdigitated electrode array of characteristic dimension 80 $\mu$m. A 5 V (rms), 10 kHz, signal was applied to the microelectrodes. The resulting distributions of red blood cells and bacteria are similar to those shown in FIGS. 14*a* and 14*b*. As can be seen from these Figures, the blood cells (6 $\mu$m diameter) collected as triangular aggregations in the electrode bay regions and in diamond-shaped patterns on the surfaces of the electrodes, whilst the smaller bacteria collected at the electrode edges. A small proportion (less than 5%) of the erythrocytes were trapped by steric hindrance within the bacterial populations.

Measurements on the separate *erythrocyte* and bacteria suspensions, using the pin electrode system of FIG. 1, revealed that at 10 kHz and in the 10 $mS.m^{-1}$ sucrose+ glucose medium, the *micrococci* and *erythrocytes* experienced positive and negative dielectrophoretic forces, respectively. This is in agreement with the earlier designations of the triangular, diamond-shaped and pearl-chain collection patterns obtained for yeast cells when using the interdigitated electrodes (Pethig R, Huang Y, Wang X-B and Burt J. P. H. (1992) J. Phys. D: Appl. Phys. 25 881-8).

The different behaviour of the blood cells and bacteria is primarily related to the fact that the blood cells are bounded by lipid membranes, whilst the bacteria are bounded by heteropolysaccharide cell walls. At a frequency of 10 kHz the blood cell membranes appear more resistive than the 10 $mS.m^{-1}$ suspending medium (ie $Re[f(\epsilon^*_p,\epsilon^*_m)]$ is negative) and so they experience a negative dielectrophoretic force. The cell walls of the bacteria, on the other hand, have electrical properties similar to ion exchange resins and are relatively conducting (ie $Re(f(\epsilon^*_p,\epsilon^*_m)]$ is positive). The *micrococci* therefore experience the potential energy profile of FIG. 7, whilst FIG. 8 corresponds to the situation for *erythrocytes* experiencing negative dielectrophoresis ($Re[f(\epsilon^*_p,\epsilon^*_m)]=-0.2$).

The collection patterns obtained are thus in good agreement with those expected when the blood cells and bacteria rearrange themselves so as to minimize their potential energies.

Figure 9:
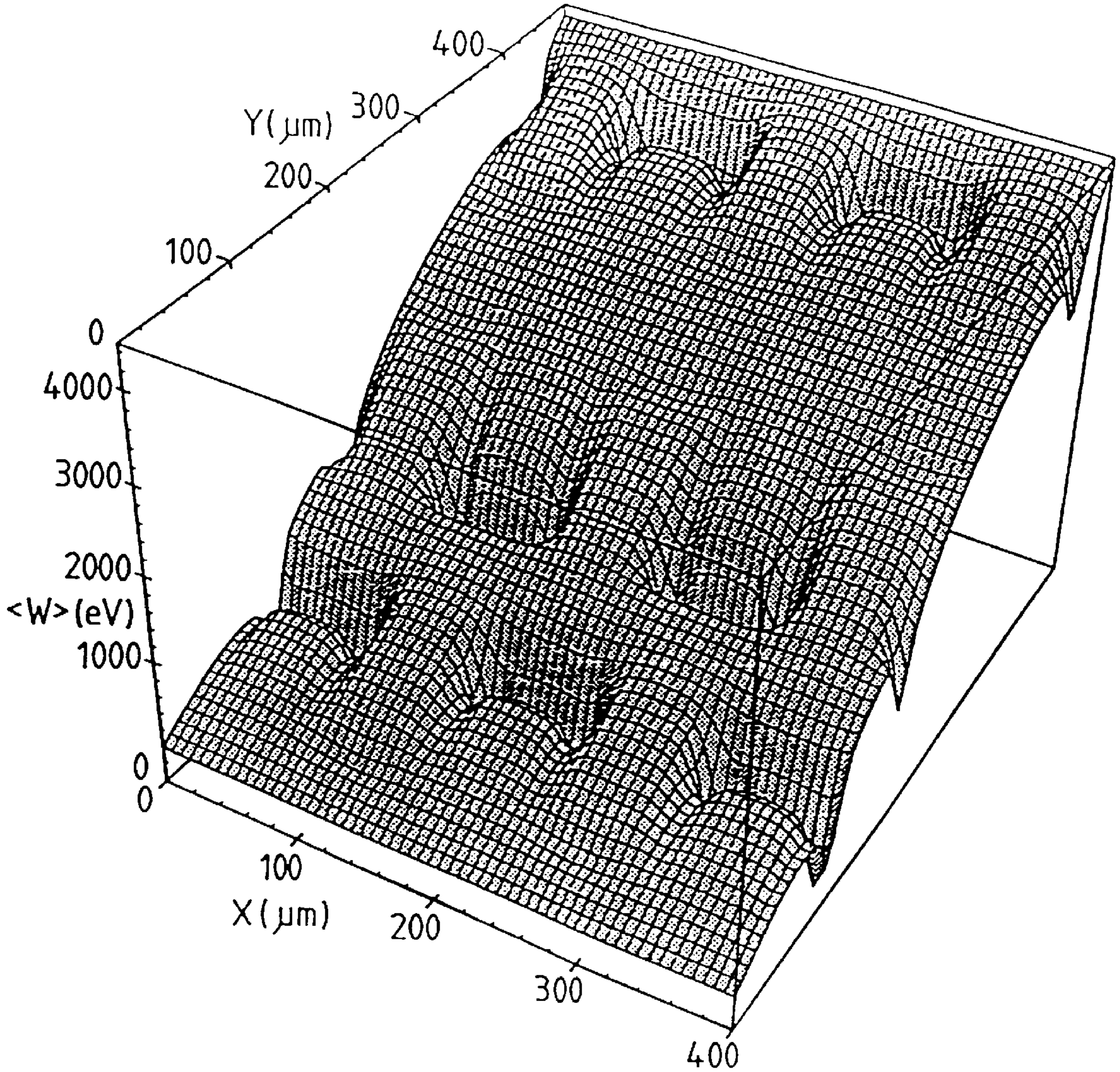
FIGS. 9 and 10 show the potential energy profiles of FIGS. 7 and 8 respectively modified by superimposition of an extra translational force of the order 1.5 pN.
Figure 10:
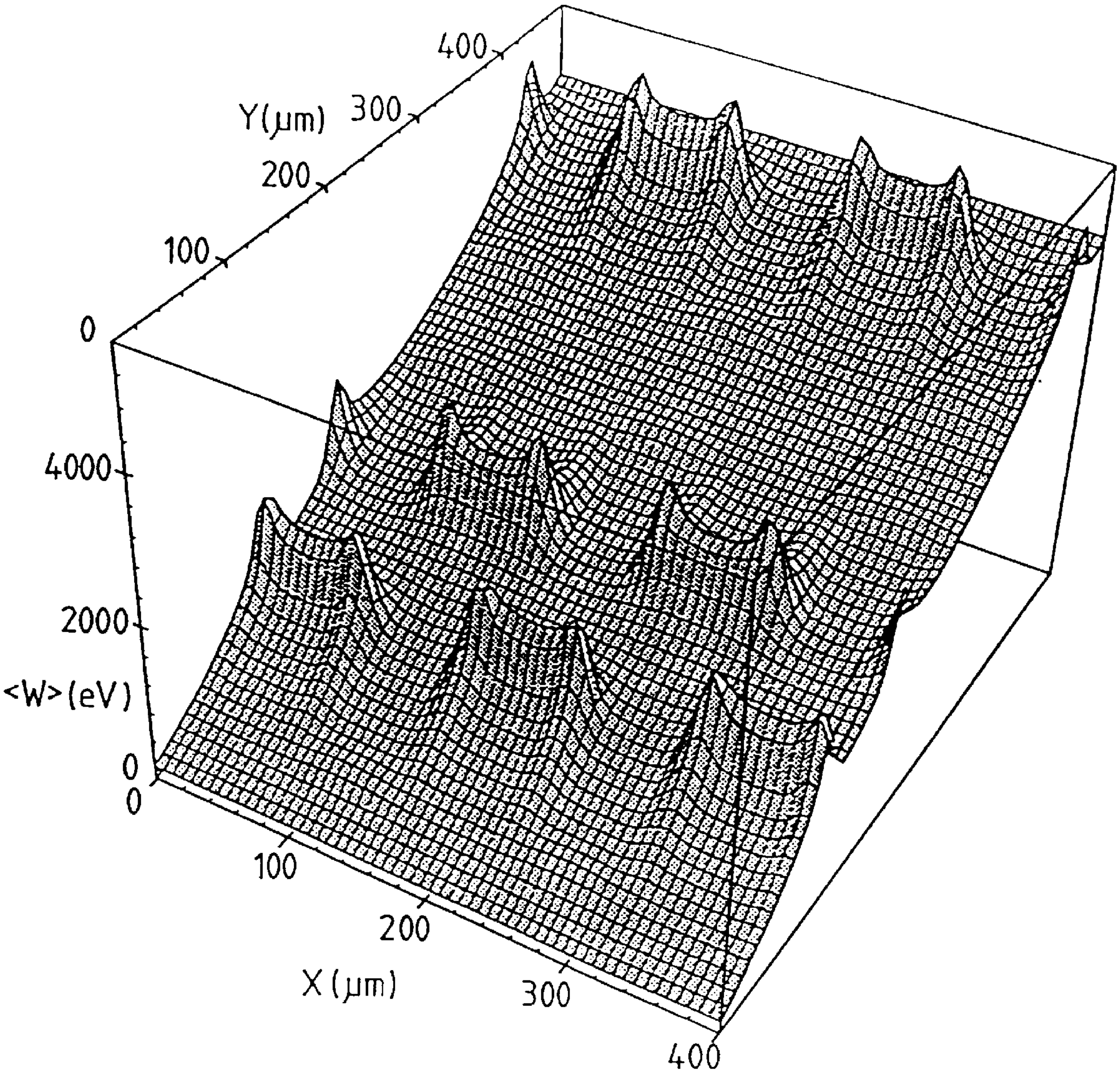

Finally, the result shown in FIGS. 9 and 10 indicate that particles retained by a negative dielectrophoretic force are more easily released than those held by positive dielectrophoretic forces. This was verified by flushing liquid over the electrode array. After separation of the micrococci and red blood cells using a 5V rms (10 kHz) signal, and with this signal maintained, the blood cells were removed by the flowing liquid, whereas the bacteria remained firmly trapped at the electrode edges. On removing the voltage signal, the bacteria could then be flushed away. A similar result was obtained for a mixture of viable and non-viable yeast cells in 1 $mS.m^{-1}$ mannitol solution. A 5 V (rms), 10 MHz, signal resulted in the viable cells being trapped at the electrode edges and remaining there under exposure to a cross-flow of liquid, whereas the non-viable cells, which initially collected in similar diamond-shaped and triangular-shaped aggregations for *erythrocytes,* were swept away.

Conclusions

In previous work as mentioned above, it was demonstrated that electrodes of polynomial and interdigitated, castellated geometry can facilitate particle collection arising from both positive and negative dielectrophoretic effects. A theoretical explanation was presented in terms of the electric field patterns generated by the electrodes. We have extended this here to consideration of the potential energy surfaces experienced by particles subjected to dielectrophoretic forces. Furthermore, we have demonstrated that by careful choice of the conductivity of the suspending medium it is possible to find a frequency range where the different particle types in an heterogeneous suspension are directed into spatially separated potential energy wells, according to the polarity of the dielectrophoretic forces acting upon them. Good agreement between theory and experiment was obtained concerning the collection patterns observed using the polynomial and interdigitated electrodes and the locations and geometric form of the potential energy surfaces.

For the case of the interdigitated, castellated electrodes it has been found that particles trapped in potential energy wells under the action of negative dielectrophoresis can be more easily removed from the electrode structure (e.g by fluid flow or gravitational forces) than those trapped under positive dielectrophoresis. Such selective confinement and release of the different particle types in heterogeneous suspensions can be envisaged to have interesting applications in the biomedical and biotechnological sciences.

One way in which the invention may be performed will now be described with specific reference to FIGS. 11 to 18 inclusive.

Figure 11:
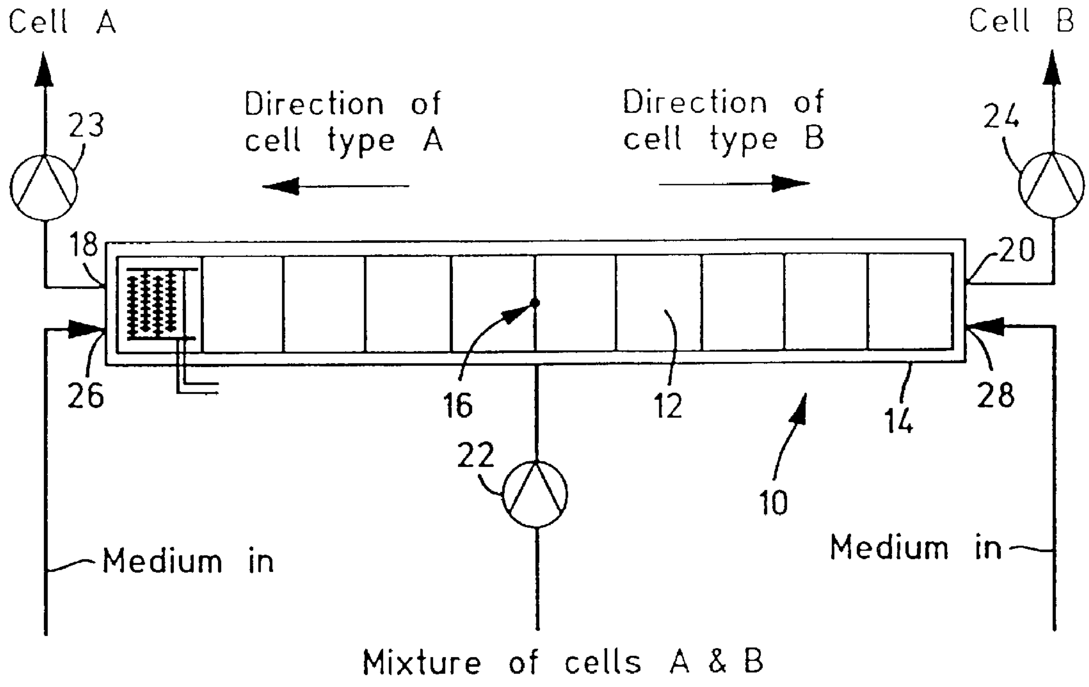
FIG. 11 is a simplified diagrammatical view of part of a separator arrangement.
Figure 12:
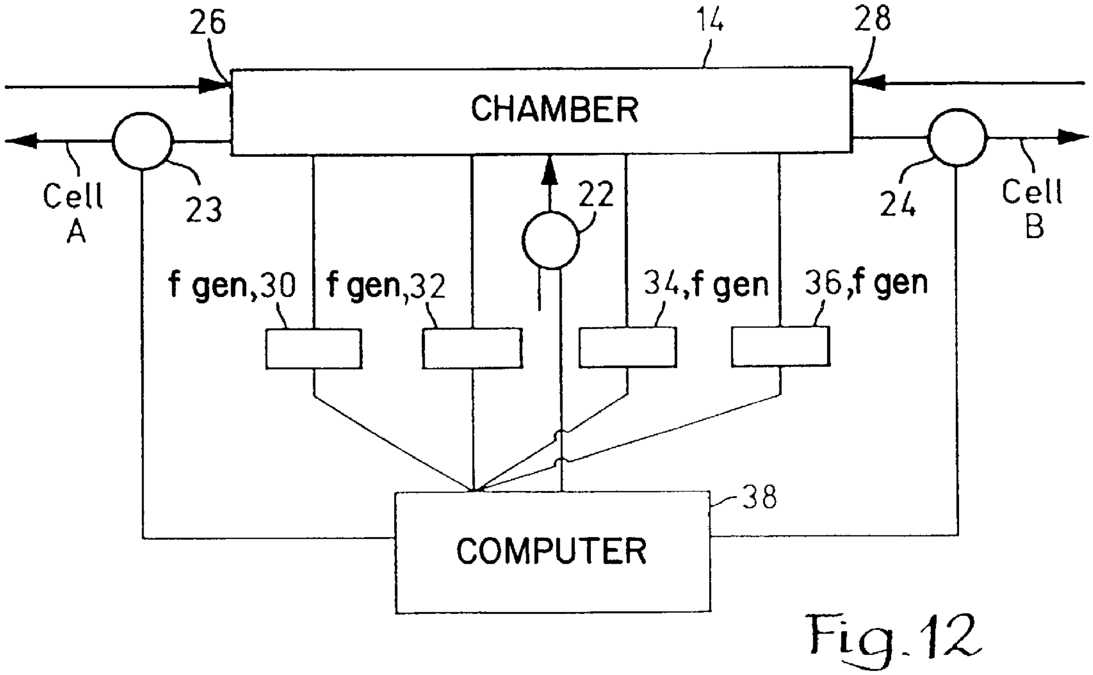
FIG. 12 is an overall schematic view of the separator of FIG. 11 and shows frequency generators under the control of a computer.

Referring briefly to FIGS. 11 and 12, a filter or separator shown generally at 10 comprises an array of electrodes 12 (shown in detail in FIG. 13) housed within a reservoir or chamber 14. The chamber 14 has an inlet 16 and a first outlet 18 and a second outlet 20. A pump 22 pumps a solution (not shown) into the chamber 14. The solution contains a mixture of cells A and B. The mixture comprises living or viable cells B and dead or non-viable cells A. These cells A and B are of the same cell variety.

The solution passes over the array of electrodes 12 and the cells A and B are subjected to different dielectrophoretic forces depending on whether they are alive or dead. The forces affect the resultant movement of cells A and B within the chamber 14. The resultant effect is that A type cells are urged towards the first outlet 18 and that B type cells are urged towards the second outlet 20. However, several steps are involved in the separation process and these are described in detail with reference to FIGS. 13*a* to 13*d* below.

Pumps 23 and 24 are used to pump the liquid supporting the cells backwards and forwards within the chamber 14. The pumps 23 and 24 may also pump liquid rich in A type or B type cells respectively to further filtering chambers (not shown) in order to concentrate the cells further. It will be appreciated that a cascade of filters or separators may be connected together in series to enable the separation of more than two different species of cell, protein or any other substance which experiences a DEP force within a DEP field. In addition separate inlets 26 and 28 may be optionally provided to allow a different, inert medium to pass through the filtering chamber 14 and collect the A and B type cells. However, it is appreciated that this is not required but optional. The liquid supporting the two types of cell enters via inlet 16 under pressure of pump 22.

Four frequency generators 30, 32, 34 and 36 are linked to selected sub-groups of electrodes 30A, 32A, 34A and 36A respectively within the chamber 14 and are controlled by computer 38. It will be appreciated that a single frequency generator may be used instead of four separate frequency generators. The single frequency generator may be connected to an amplifier (not shown). Pumps 22, 23 and 24 are also controlled by the computer 38. The frequency generators 30, 32, 34 and 36 are switched so as to vary the dielectrophoretic fields between the electrodes thereby causing different DEP forces to be applied to cell type A and cell type B. The cells A are confined to triangular regions whilst the cells B are attracted by strong DEP forces to the electrode surfaces. Pumps 23 and 24 are then used, alternatively, to urge fluid in one direction or the opposite direction as described below. The overall result is that liquid exhausting from the second outlet 20 is richer in cell type B than that exhausting from the first outlet 18; and liquid exhausting from the first outlet 18 is richer in cell type A than that liquid exhausting from the second outlet 20. This is explained generally with reference to FIGS. 13 to 18 below.

Figure 13A:
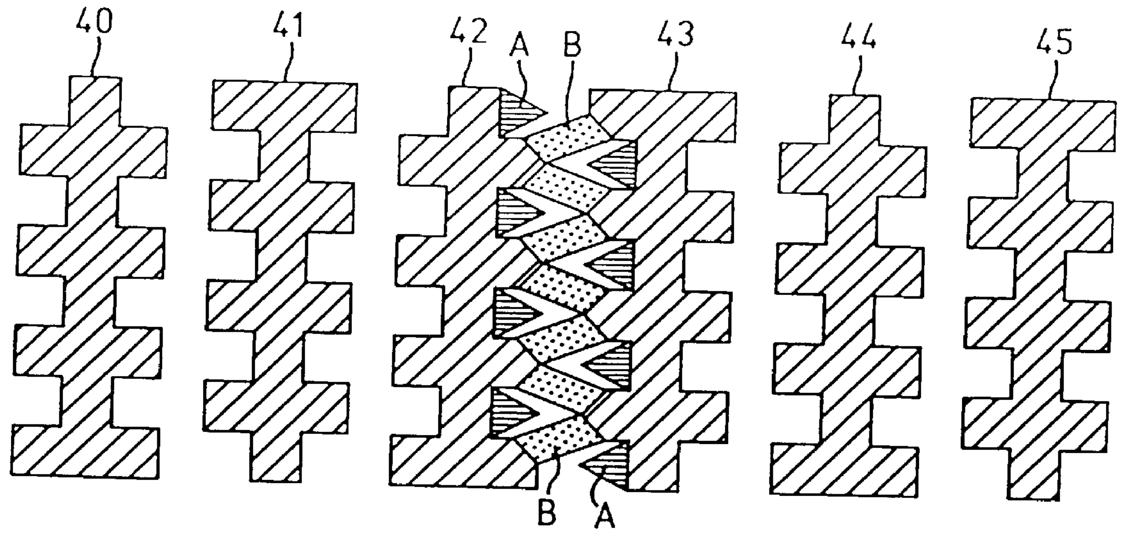
FIGS. 13*a* to 13*d* illustrate diagrammatically, and in a simplified manner, plan views of interdigitated electrodes which are part of the separator of FIG. 11 and how these are used to separate two types of particles A and B.

FIGS. 13*a* to 13*d* show views of a portion of an electrode array 12 in four sequential instances of time, although the time intervals may not necessarily be equal. A mixture of cell types A and B is introduced into the chamber 14. A dielectrophoretic field is applied which-attracts cell type B to a greater extent than cell type A to particular portions of the electrode. FIG. 13*a* shows an initial instant at which cells of type A and type B form separate patterns between adjacent electrodes 42 and 43. The views in FIGS. 13*a* to 13*d* show three pairs of electrodes 40 and 41; 42 and 43; and 44 and 45. A dielectrophoretic field tends to separate the cell types A and B such that cell type B forms chains, which are herein referred to as pearl chains, between "peaks" or "tips" of oppositely facing electrodes 42 and 43. Cell type A tends to form around surfaces of electrodes 42 and 43, and within "troughs" or "bays" of oppositely facing electrodes, into triangular or diamond patterns. The grouping of the two different types of cells is explained above in the section headed "Theory" although brief reference is made to the phenomenon, from an energy point of view, below with reference to FIGS. 15 to 18.

Figure 13B:
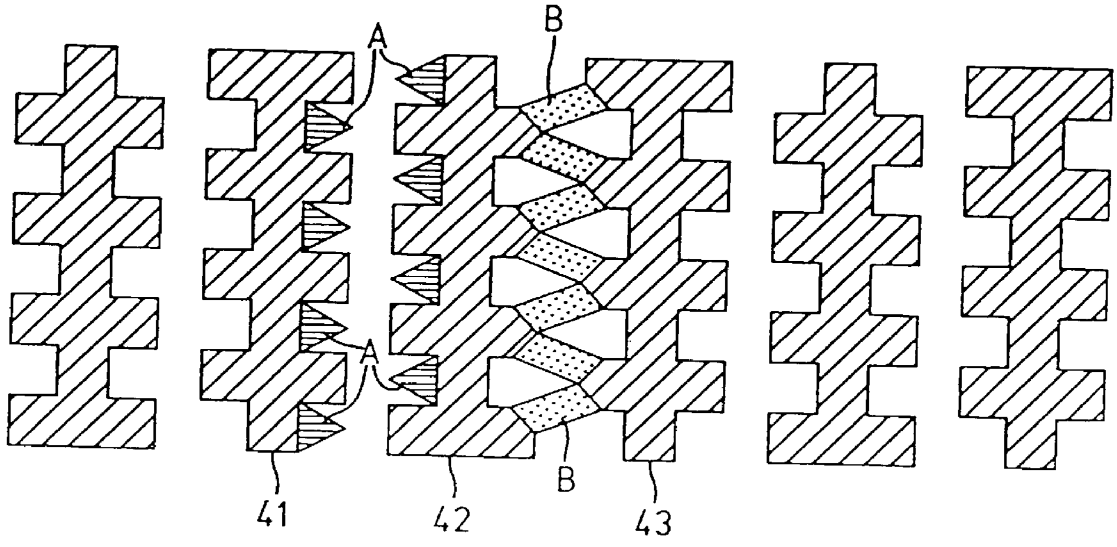

FIG. 13*b* shows what occurs whilst the dielectrophoretic field is maintained between the electrodes 42 and 43 and when liquid supporting the cells A and B is urged through the chamber 14 by pump 23. The A type cells are forced (to the left) in the direction of outlet 18 as they are held by weaker DEP forces. The B type cells remain attached to the surfaces of electrodes as they are held by relatively stronger DEP forces. Thus cell type A moves in a direction of electrode 41 whilst maintaining cell type B, in situ between electrodes in "pearl chains".

Figure 13C:
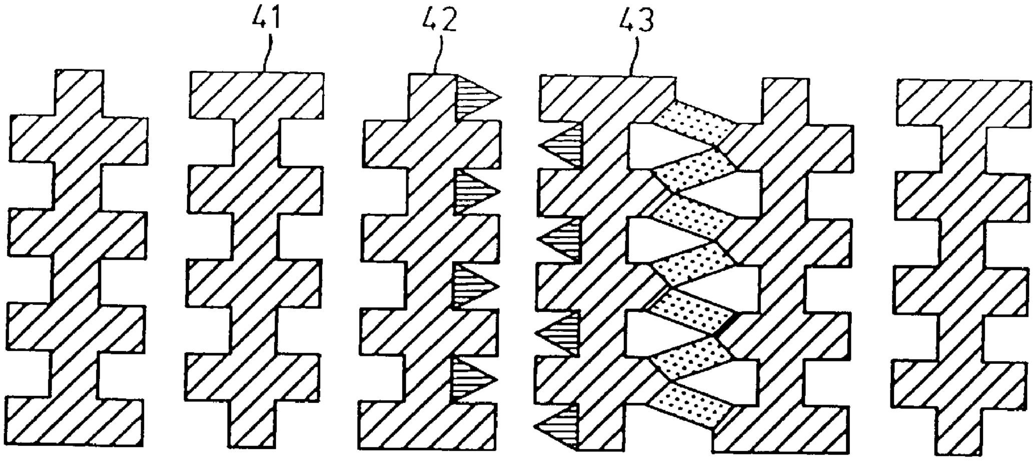

FIG. 13*c* shows a subsequent instant when the dielectrophoretic field is switched off. Liquid via inlet 16 is introduced under pressure by pump 22. Both cell types A and B are moved to the right in the direction of outlet 20. The DEP field is then re-established.

Figure 13D:
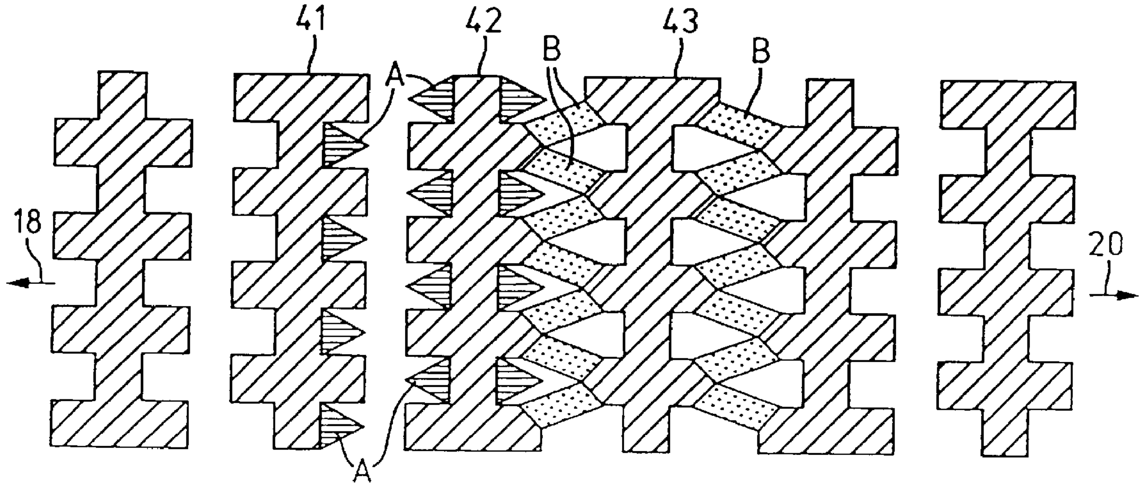

FIG. 13*d* shows the DEP field switched on. It is appreciated that the A type and B type cells have been displaced (by one electrode pair) towards exit 20 (i.e. towards the right hand side of the page). B type cells are now attracted to electrodes 43 and 44 in the DEP field. These are different electrodes from those to which the B type cells were previously attracted. In general the electrodes will be to the right of the electrodes.

Pump 23 then urges fluid towards exit 18 and in doing so type A cells are also moved towards exit 18. The overall result is that the two cell types A and B are spatially divided. At each further step of spatial division the concentrations of cell types A and B become purer the closer they are to respective outlets. Cell type B, trapped within clusters of cell type A, become randomly dislodged and are urged towards the relevant outlet, and vice versa. This also has the effect of improving separation.

A fresh charge of solution containing cell types A and B is then introduced into the separator between electrodes 42 and 43 and the process is then repeated such that subsequent cycles of switching give rise to continuous resultant displacement of cell type A towards exit 18 and cell type B towards exit 20. The concentration of each cell type becomes purer at each step.

Figure 14A:
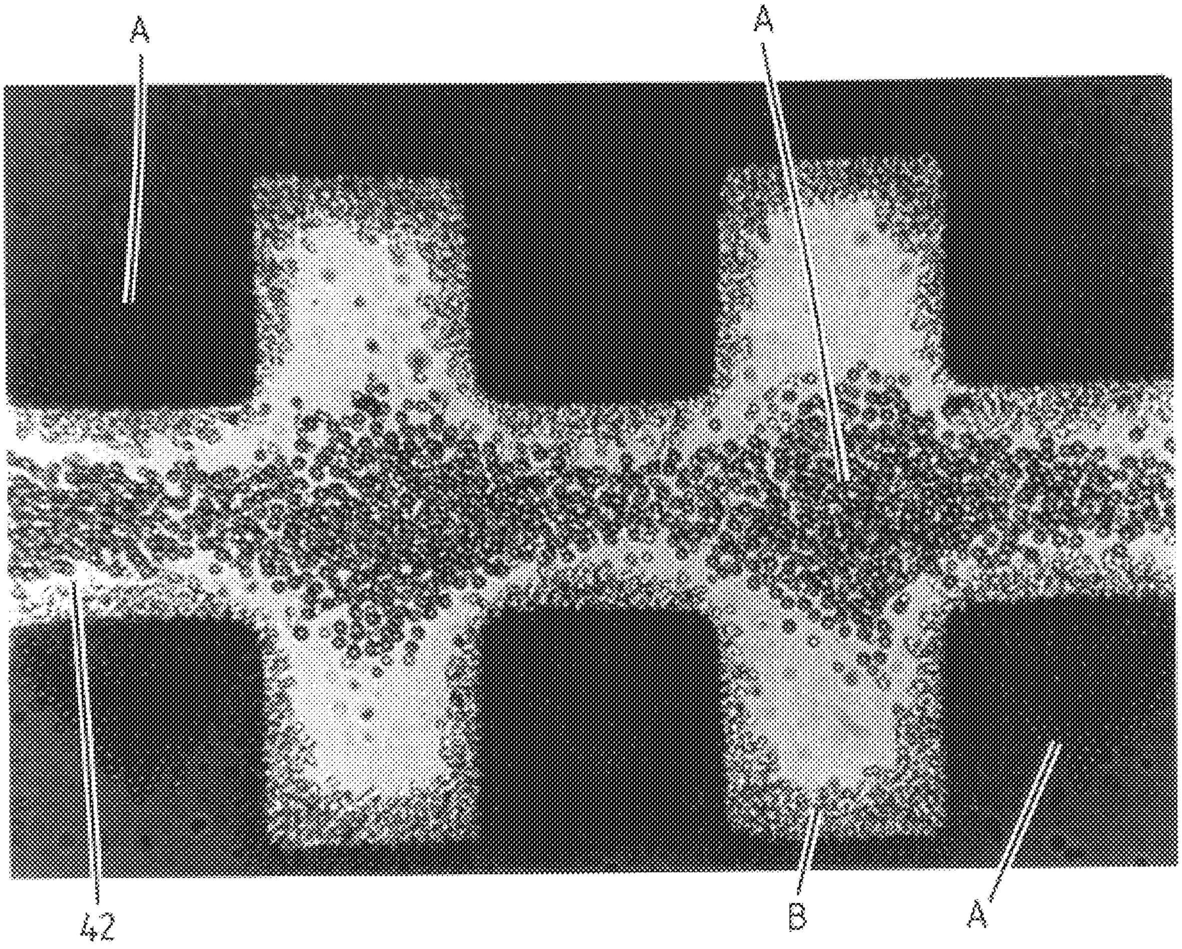
Figure 14*a* shows an enlarged plan view of a portion of an interdigitated electrode.

FIG. 14*a* is an enlarged view of cells accumulating around a surface of an electrode 42, the triangle of A type cells being shown in the "troughs" of electrode 42.

Figure 14B:
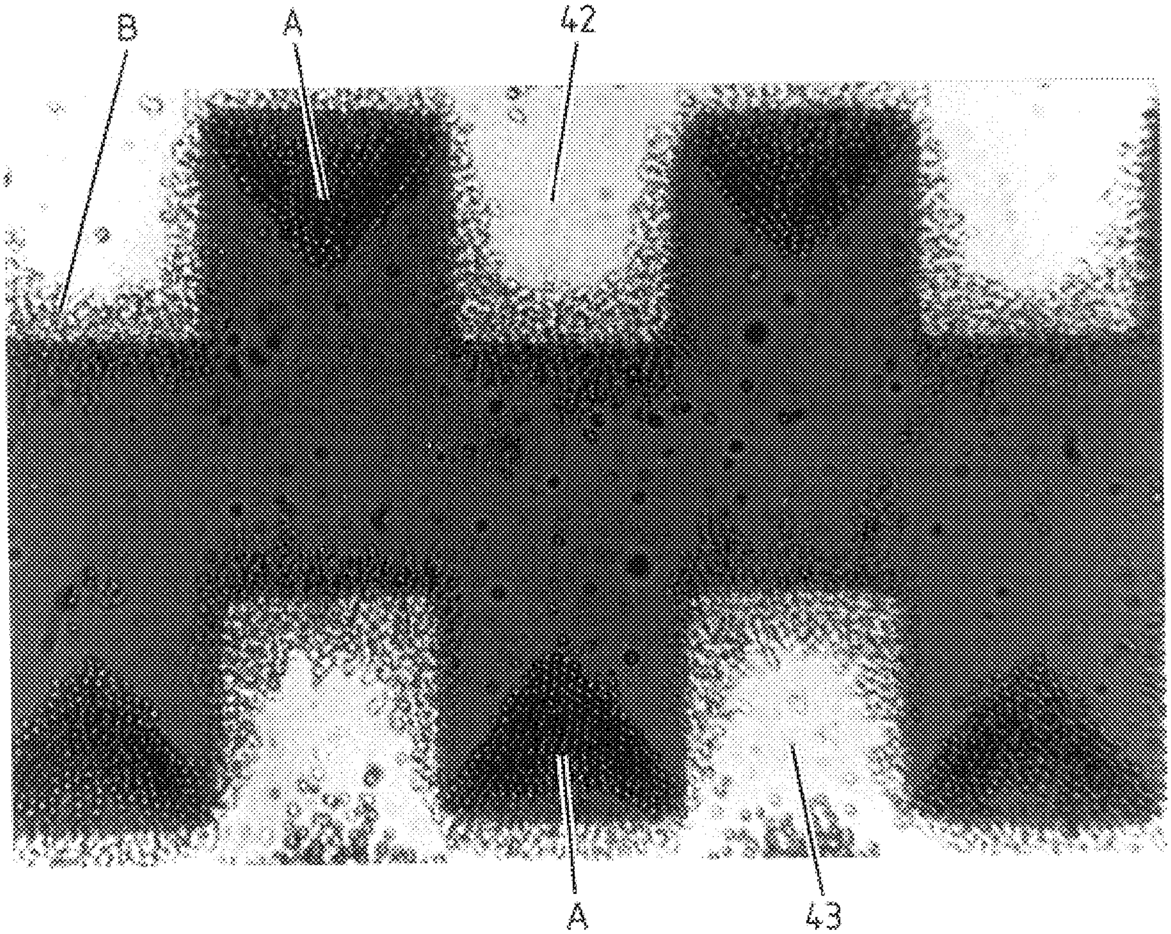
FIG. 14*b* shows an enlarged plan view of portions of an interdigitated electrode pair and shows grouping of first and second cell types (A and B) around different portions of the electrodes.
Figure 15A:
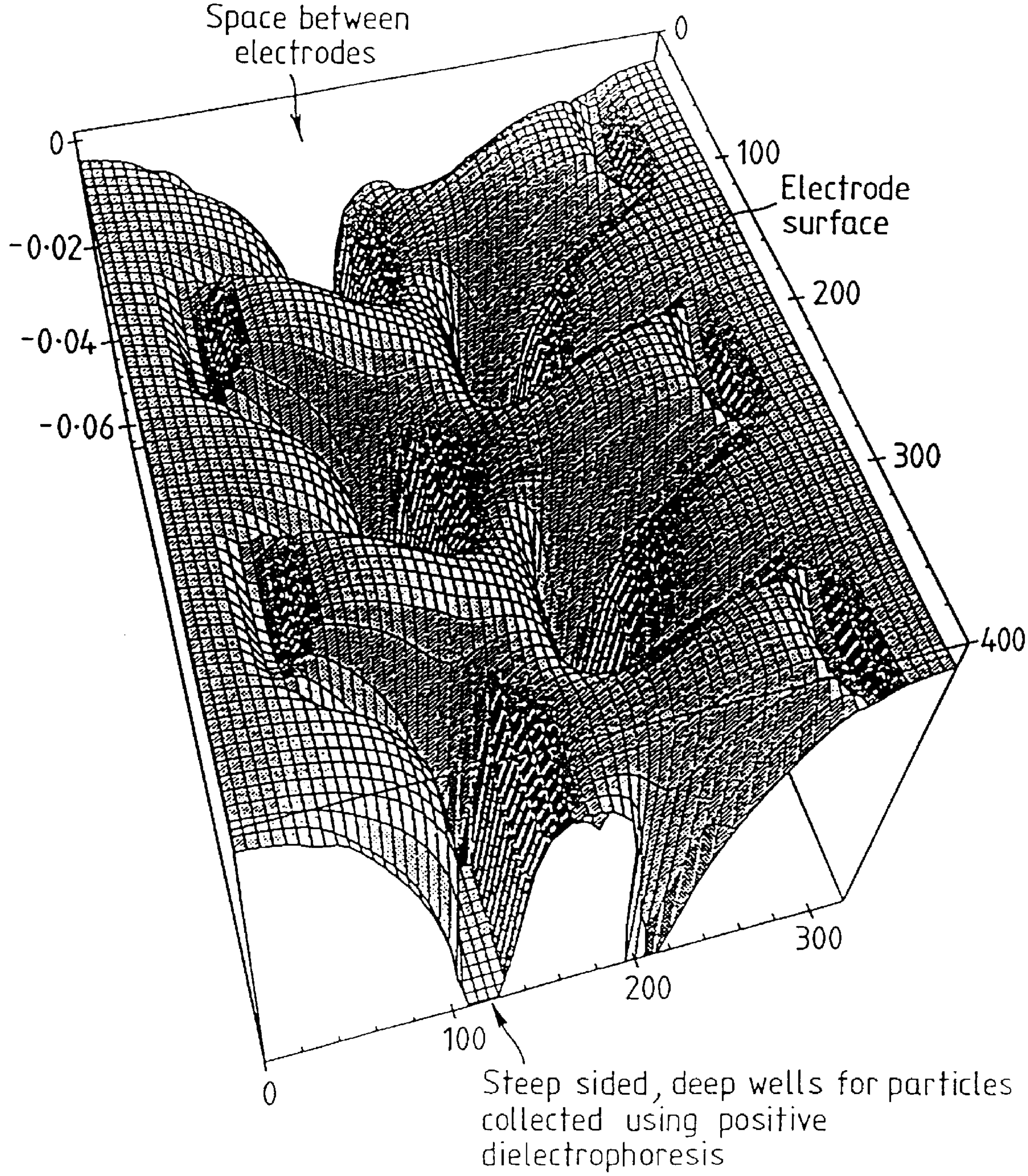
FIG. 15*a* shows a graph of a three dimensional surface representing positive dielectrophoretic field potential between adjacent electrodes.
Figure 15B:
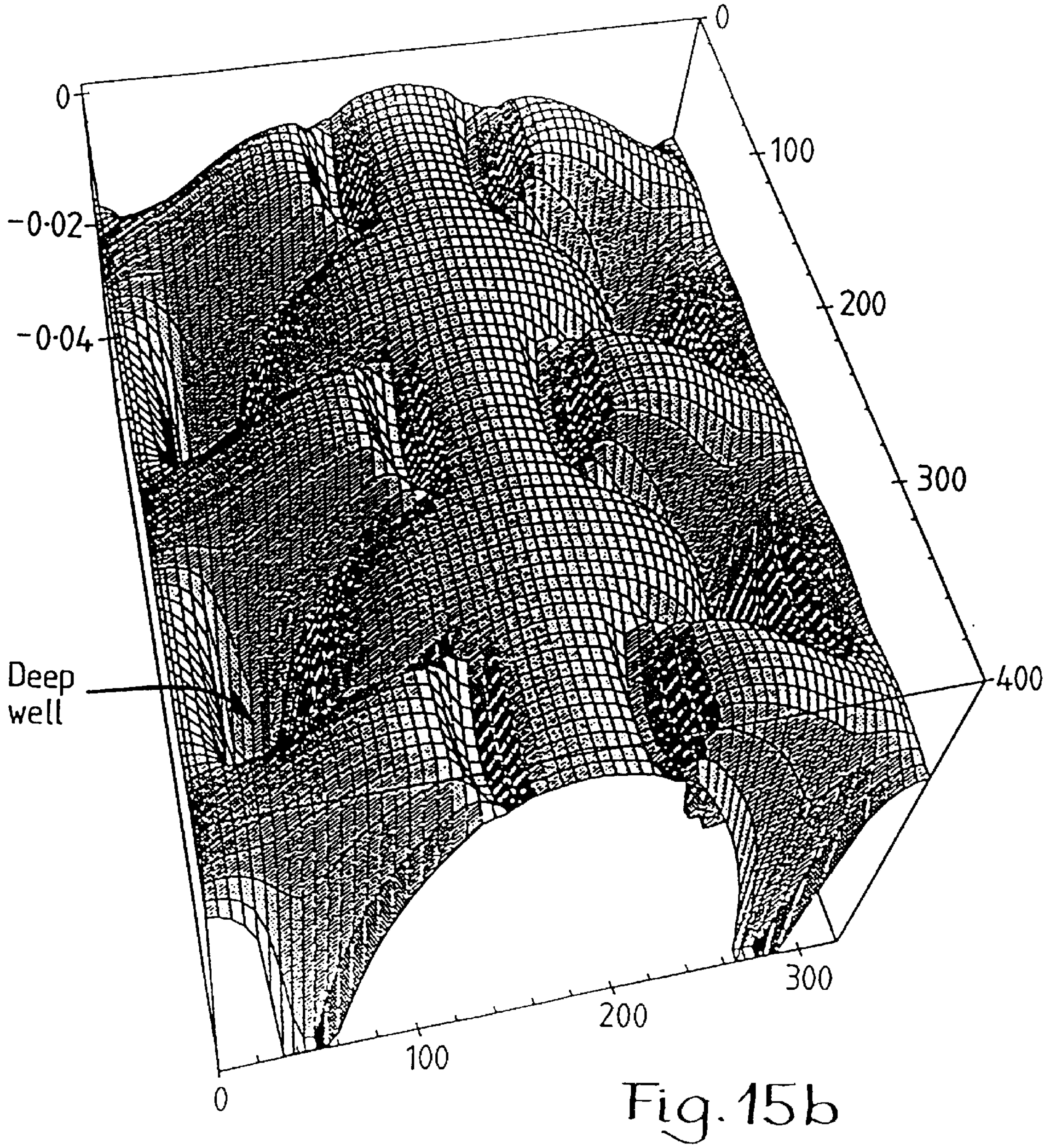
FIG. 15*b* shows a graph of a three dimensional surface representing positive dielectrophoretic field potential.
Figure 16A:
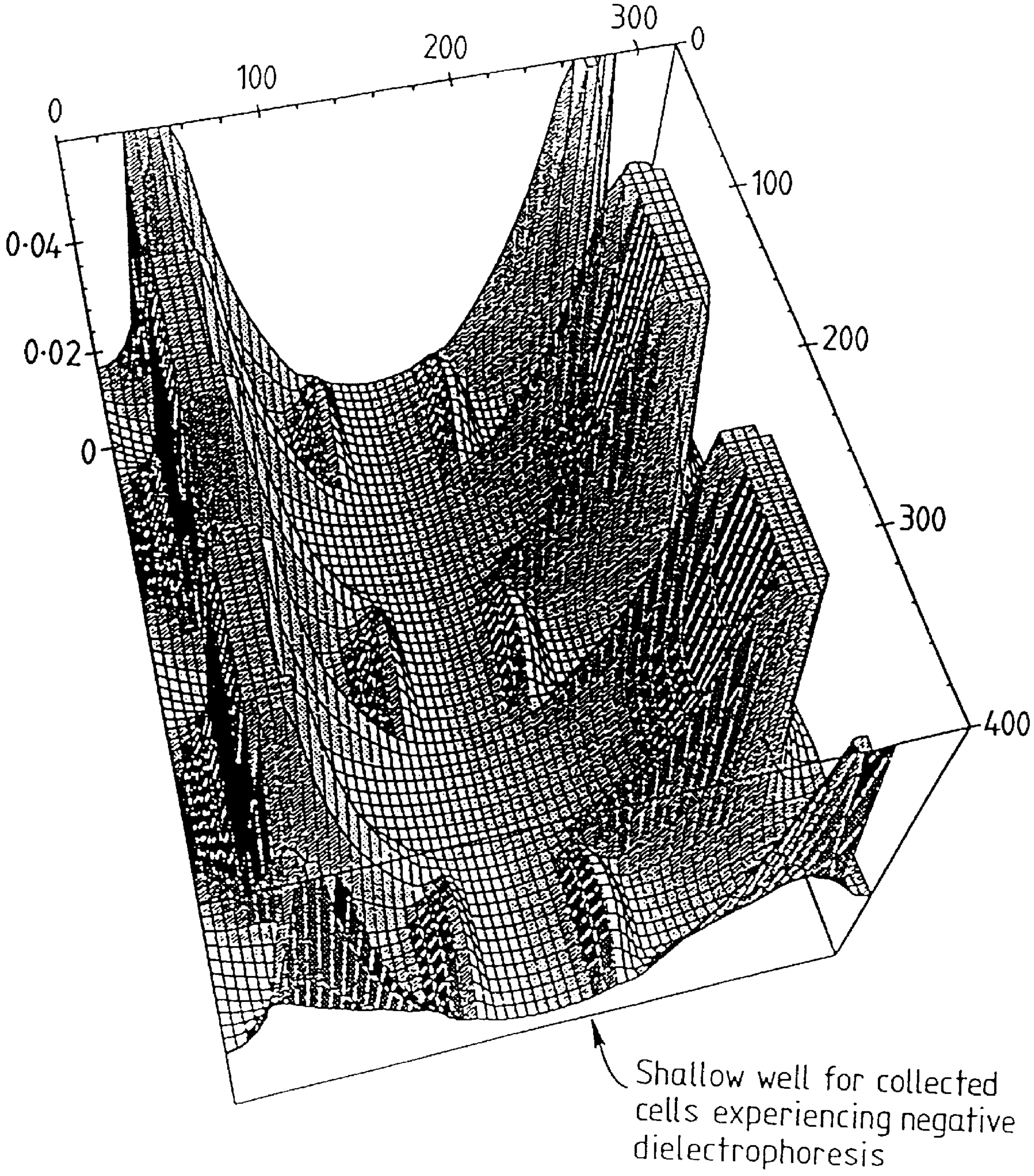
FIG. 16*a* shows a graph of a three dimensional surface representing negative dielectrophoretic field potential.
Figure 16B:
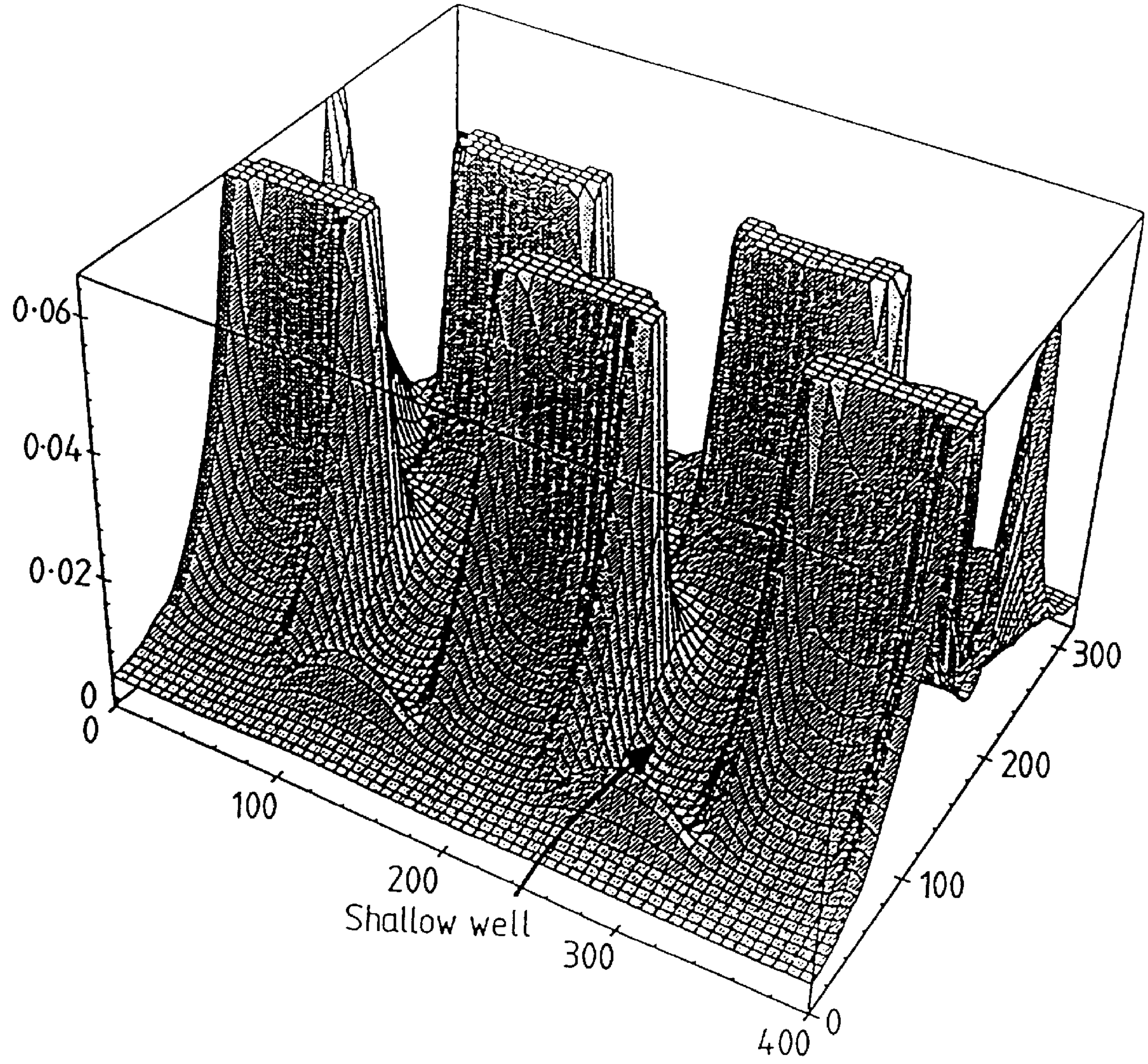
FIG. 16*b* shows a graph of a three dimensional surface representing negative dielectrophoretic field potential.

FIG. 14*b* is an enlarged view between two electrodes 42 and 43 and shows the "pearl chains" of cell types B between "peaks" of electrodes and the triangular shapes of cell type A.

FIGS. 15*a*, 15*b*, 16*a* and 16*b* show diagrammatically the steep sided deep potential energy "wells" or "valleys" in which cell types B are collected. The analogy of the depth of "wells" or "valleys" is that described above. Cell type B "falls" into a relatively deep "valley", whereas cell type A tends to accumulate at the summit of hills from where they are easily removed.

One particular experiment is described in detail below and with reference to FIGS. 19 to 25 and illustrates the effectiveness of the filter or separator in separating live and dead cells of a particular cell variety. An experimental station, as depicted in FIG. 23, was used as a batch separator to separate two types of cells. Efficiency of separation was then measured by absorbance techniques, methylene blue staining and plate counts.

Brief Summary of Experiment

Dielectrophoresis, the movement of particles in non-uniform electric fields, was used to rapidly separate viable and non-viable yeast cells with good efficiency. Known mixtures of viable and heat-treated cells of *Saccharomvces cerevisiae* were separated and selectively isolated using positive and negative dielectrophoretic forces generated by microelectrodes in a small chamber. Good correlations with the initial known relative compositions were obtained by direct microscopic counting of cells at the electrodes after initial dielectrophoretic separation (r=0.995), from methylene blue staining (r=0.992) and by optical absorption measurements (r=0.980) of the effluent after selectively flushing out the viable and non-viable cells from the chamber. Through measurement of cell viability by staining with methylene blue and plate counts, for an initial suspension of ca. 1.4×107 cells $ml^{-1}$ containing 60% non-viable cells, the dielectrophoretically separated non-viable fraction contained 3% viable cells and the viable fraction 8% dead cells. The separation efficiency is increased by dilution of the initial suspension or by repeat operation(s). Cell viability was not affected by the separation procedure.

The determination of cell viability is not straightforward and results are often very dependent on the technique employed. However, such determination is of considerable practical and theoretical importance (Jones, 1987; Higgins, 1992; Kaprelyants and Kell, 1992) and the development of new techniques for the study of cell death, as well as for the physical separation of viable and non-viable cells in a mixed population, would be very useful. The phenomenon of dielectrophoresis is capable of providing the basis for such techniques.

Dielectrophoresis (DEP) is the movement of particles in non-uniform AC electric fields, the theory and practice of which is well documented (Pohl, 1978a & b; Pethig, 1979, 1991). As a result of an externally imposed electric field a dipole moment is induced in the particle (cell), and if the field is non-uniform the particle experiences a net translational force which may direct it either towards or away from high field regions. This induced motion constitutes the DEP effect, and for cells is comprised of several frequency-dependent components (Burt et al., 1990; Pethig 1991; Pethig et al., 1992).

Below around 1 kHz the effect is largely controlled by polarizations associated with surface charge effects, whilst between 1 kHz and 1 MHz surface conduction, dipolar relaxations at membrane or cell wall surfaces, membrane fluidity, as well as transmembrane ion transport processes, are dominant influences. Above 1 MHz the controlling influences on the DEP response are membrane capacitance and interfacial polarizations associated with surface and internal cell structure. The main variables under the experimenter's control are the conductivity and permittivity of the suspending medium and the frequency of the applied field. Thus, it is possible to choose the variables such that a mixture of particles with different DEP properties can be separated, and this is greatly facilitated using microelectrodes of an interdigitated, castellated, design (Price et al., 1988; Burt et al., 1989, 1990; Pethig et al., 1992).

It has already been shown (Pohl, 1978a & b; Huang et al., 1992) that the DEP properties of viable and non-viable yeast cells are significantly different, and differences have also been reported using the closely related techniques of dielectric spectroscopy (Boulton et al., 1989; Stoicheva et al., 1989; Markx et al., 1991) and electro-rotatlion (Hölzel and Lamprecht, 1992; Huang et al., 1992). The DEP method used by Pohl (Pohl and Hawk, 1966; Crane and Pohl, 1968; Pohl, 1978a & b) and Mason and Townsley (1971) to separate cells employed one-electrode (and counter-electrode) only and did not provide a good efficiency in separation. The method described below employs two new features to achieve a high efficiency of separation. These are the use of interdigitated microelectrode arrays and the controlled application of both positive and negative dielectrophoretic forces. Also, the method is in principle generic since the dielectrophoretic properties can vary considerably between cells of different organisms, and indeed is also dependent on physiological states other than the viability (Mason and Townsley, 1971; Pohl, 1978a & b; Pethig, 1991; Gascoyne et al., 1992).

The dielectrophoretic separation method described here operates on the basis, as described above (Huang et al., 1992). That is frequency ranges can be found where: (i) Both viable and non-viable yeast cells exhibit positive DEP and (ii) Viable cells exhibit positive DEP and non-viable cells negative DEP. The other phenomenon exploited is associated with the fact that when using interdigitated, castellated microelectrodes, cells collected under positive DEP are held in deep and steep-sided potential energy wells at electrode edges; whereas under the influence of negative dielectrophoretic forces, the cells are retained as triangular-shaped aggregations in shallow potential energy wells (Gascoyne et al., 1992; Pethig et al., 1992). Thus, cells attracted to the electrodes by positive DEP are not easily dislodged by flushing fluid over the electrodes, whereas those cells retained by negative DEP are readily and selectively removed by such action.

METHODS

Yeast:

The yeast used was baker's yeast (*Saccharomyces cerevisiae,* strain RXII, obtained from the Institute of Biophysics, Free University of Berlin) grown at 30° C. in a medium of pH 5 consisting of 5 g $1^{-1}$ yeast extract (Oxoid), 5 g $1^{-1}$ bacterial peptone (Oxoid) and 50 g $1^{-1}$ sucrose. The yeast was grown overnight, harvested and washed 4 times in 280 mM mannitol. The cells were rendered non-viable by heating to 90° C. in a waterbath for twenty minutes, after which they were washed as before. Suspensions with different relative amounts of viable and non-viable cells were made by mixing.

Dielectrophoretic spectrometer:

The DEP spectra of suspensions of viable and of non-viable yeast cells were measured so as to ascertain the frequency ranges where the viable and non-viable cells exhibited either positive or negative DEP. Suspensions of viable and non-viable (heat treated) yeast cells were prepared having an absorption of 0.6 at 655 nm in a cuvette of 1 cm path length (corresponding to $1.4\times10^7$ cells $m1^{-1}$), and their DEP spectra were obtained using a split-beam spectrometric system, based on a previous design (Price et al., 1988; Burt et al., 1989, 1990). One component of the split laser beam monitored the optical density of the cell suspension located between two interdigitated electrode arrays, of the same geometry as those used in the cell separation chamber. The other component of the split-beam corrected for random fluctuations of the beam intensity and also provided a reference signal to give increased sensitivity of measurement. Positive DEP manifested itself as a reduction in optical density of the cell suspension, whilst the effect of negative DEP was to increase the optical density as a result of cells being repelled away from the electrodes into the bulk suspending solution. As described elsewhere (Price et al., 1988; Burt et al., 1989) the initial rate of change of the optical absorbance, on application of the AC voltage signal to the electrodes, is proportional to the DEP collection rate of the cells.

Dielectrophoretic separation:

The cell separation chamber incorporated interdigitated, castellated microelectrodes of the same basic design and construction as those used in DEP studies of colloidal particles, bacteria, yeast and mammalian cells (Burt et al., 1989, 1990; Price et al., 1988; Pethig et al., 1992). The electrodes were fabricated onto a microscope slide and the characteristic dimension defining the castellated geometry was 80 μm. The chamber, of volume 50 μl, was constructed by placing a polyacetate spacer and a microscope cover slip on top of the electrodes, and sealing the system with epoxy resin. The cells and suspending fluid are injected into and flushed from the chamber through two small diameter tubes. The first stage of the separation process consisted of applying to the electrodes a sinusoidal voltage of such a frequency that both the viable and non-viable cells collected at the electrode tips as a result of a positive dielectrophoretic force. With this voltage signal still applied, the chamber was then flushed through with clean suspending fluid so as to remove cellular debris and cells not captured by the electrodes. The frequency of the applied voltage was then adjusted so that the non-viable cells redistributed themselves so as to collect in triangular aggregations at the electrode bay regions under the influence of a negative dielectrophoretic force, whilst the viable cells remained at the electrode tips under a positive force. With this voltage signal still applied, the chamber was then flushed through to selectively remove the non-viable cells from the chamber. The final stage involved switching off the applied voltage to the electrodes and flushing the chamber in order to remove the viable cells.

Measurement of the separation of cells of different viability was accomplished in two ways. In the first method the cells were brought into the chamber by injection, a 5 Volt (pk—pk) 10 MHz voltage was applied to the electrodes and the number of cells occurring in triangular aggregations and on top of the electrodes, and of those collected at the electrode edges, were counted by direct microscopic observation and from photographs of areas representative for the electrode arrays. To compensate for the fact that some cells were present in the chamber from previous experiments, cell counts were also made before introducing the new sample.

In the second method cells were brought into the cell by injection and collected at the electrode edges by applying a 10V (pk—pk) 10 kHz signal. Non-captured cells and any cellular debris were flushed out with 280 mM mannitol. The signal was then changed to 10 V (pk—pk) 10 MHz which had the effect of causing non-viable cells to migrate into triangular aggregations and on top of the electrodes, whilst leaving the viable ones located at the electrode edges. By passing a gentle stream of fluid medium through the DEP chamber with the 10 MHz signal applied, the non-viable cells were selectively removed from the chamber. The passage of these cells was monitored as an increase of optical absorbance at 500 nm, using a 1 cm flow-through cell and a Pye-Unicam SP6-400 (Trade Mark) spectrophotometer. On removal of the non-viable cells, the voltage was switched off and the subsequent flushing of the viable cells from the electrode edges was also recorded as an increase in optical absorbance. The absorbance signal was followed in time and the area under the two absorption peaks was measured. The flow rate through the chamber was 30 ml $hr^{-1}$, and suspensions of viable and non-viable yeast cells of the same concentration exhibited the same absorbance at 500 nm.

Estimation of Viability:

To estimate the viability of cells, they were stained with methylene blue (Stoicheva et al., 1989), and they were plated out on plates containing growth medium with 1.2% agar.

RESULTS AND DISCUSSION

Figure 22:
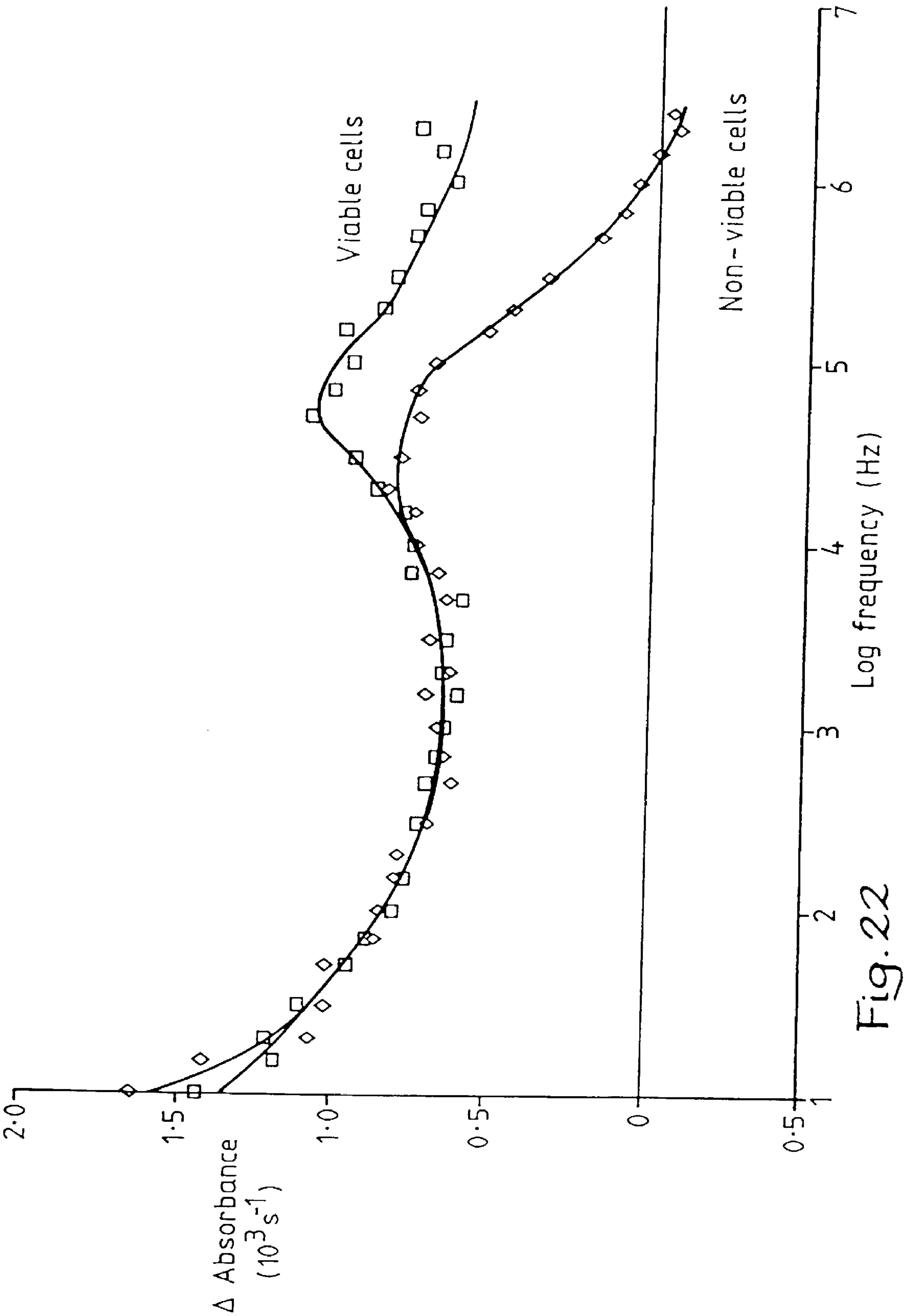
FIG. 22 shows the dielectrophoretic spectra of viable and non-viable yeast suspensions as measured with a split-beam dielectrophoretic spectrometer.
Figure 23:
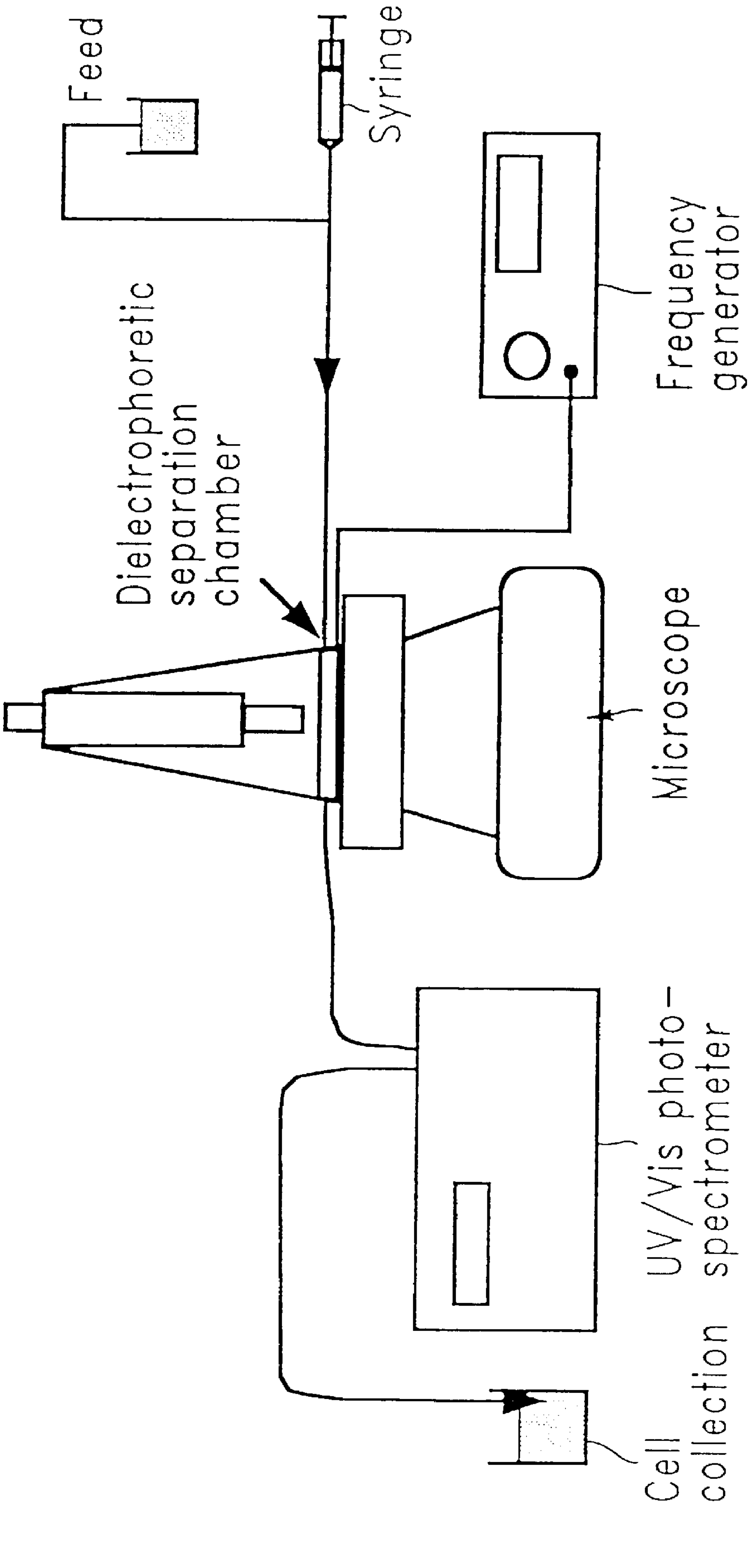
FIG. 23 shows a schematic outline of an experimental system.

The DEP spectra of suspensions of viable and non-viable yeast cells, measured using the split-beam spectrometer, are shown in FIG. 22. These spectra provided the information required to enable the conditions for cell separation to be established, namely that both the viable and non-viable cells exhibit a positive DEP of similar magnitude at 10 kHz, whilst above 2 MHz the non-viable cells exhibit a negative DEP effect and the viable ones a positive effect.

Figure 19:
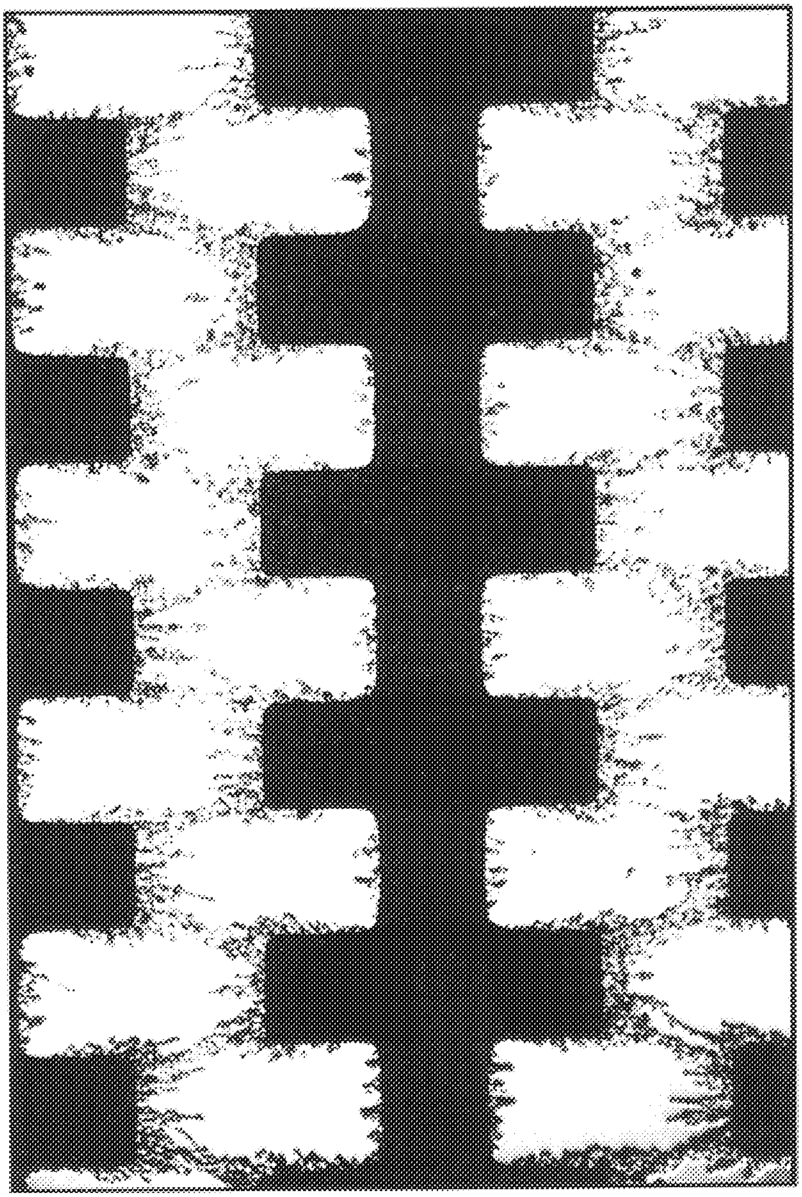
FIG. 19 shows a plan view of viable (living) and non-viable (dead) (methylene blue stained) yeast cells collected at electrodes after applying a 5V (pk—pk) 10 kHz signal.
Figure 20:
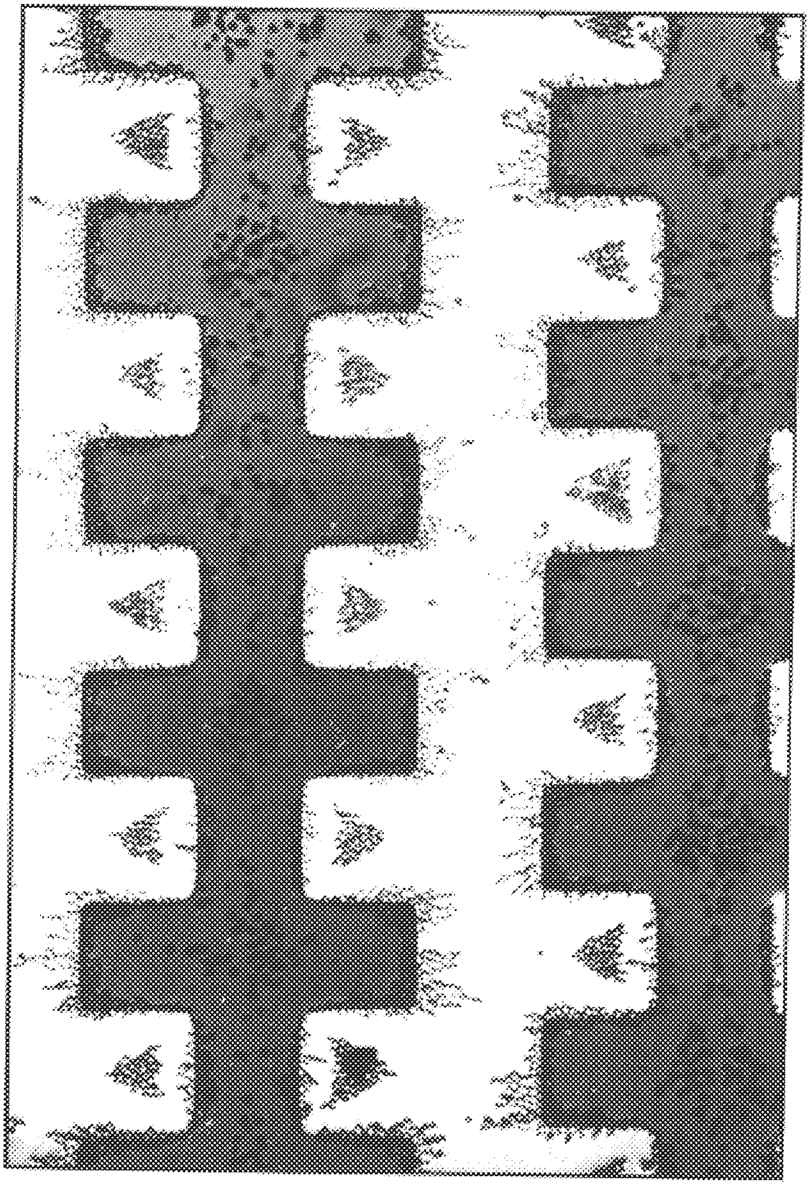
FIG. 20 shows dielectrophoretic separation of viable and non-viable yeast cells using interdigitated, castellated electrodes and a 5V (pk—pk) 10 MHz signal.

The result of applying a 5 V (pk—pk) 10 kHz voltage signal to the electrodes for a suspension containing both viable and non-viable cells is shown in FIG. 19. Both cell types collect (within 10 secs) at the electrodes. FIG. 20 shows the result of changing the frequency of the applied voltage to 10 MHz. The viable cells remain collected at the electrode edges and in “pearl chains” between the “peaks” of electrodes, whilst the non-viable cells have rearranged themselves into triangular-shaped aggregations in the electrode “bay” or “trough” regions. The non-viable cells are also collected onto the surface of the electrodes away from the electrode edges and, although not fully understood, this is considered to occur mainly under the influence of a negative dielectrophoretic effect (Pethig et al., 1992). This rearrangement of the cells is completed within 30–60 seconds. The two types of cell were thus easily recognisable and physically separated on a local scale by application of the 10 MHz signal. Observations using methylene blue treated cell suspensions confirmed that the stained cells collected in the triangular formations and on top of the electrodes, whereas the unstained (hence viable) cells collected at the electrode edges and in pearl chains.

Figure 24:
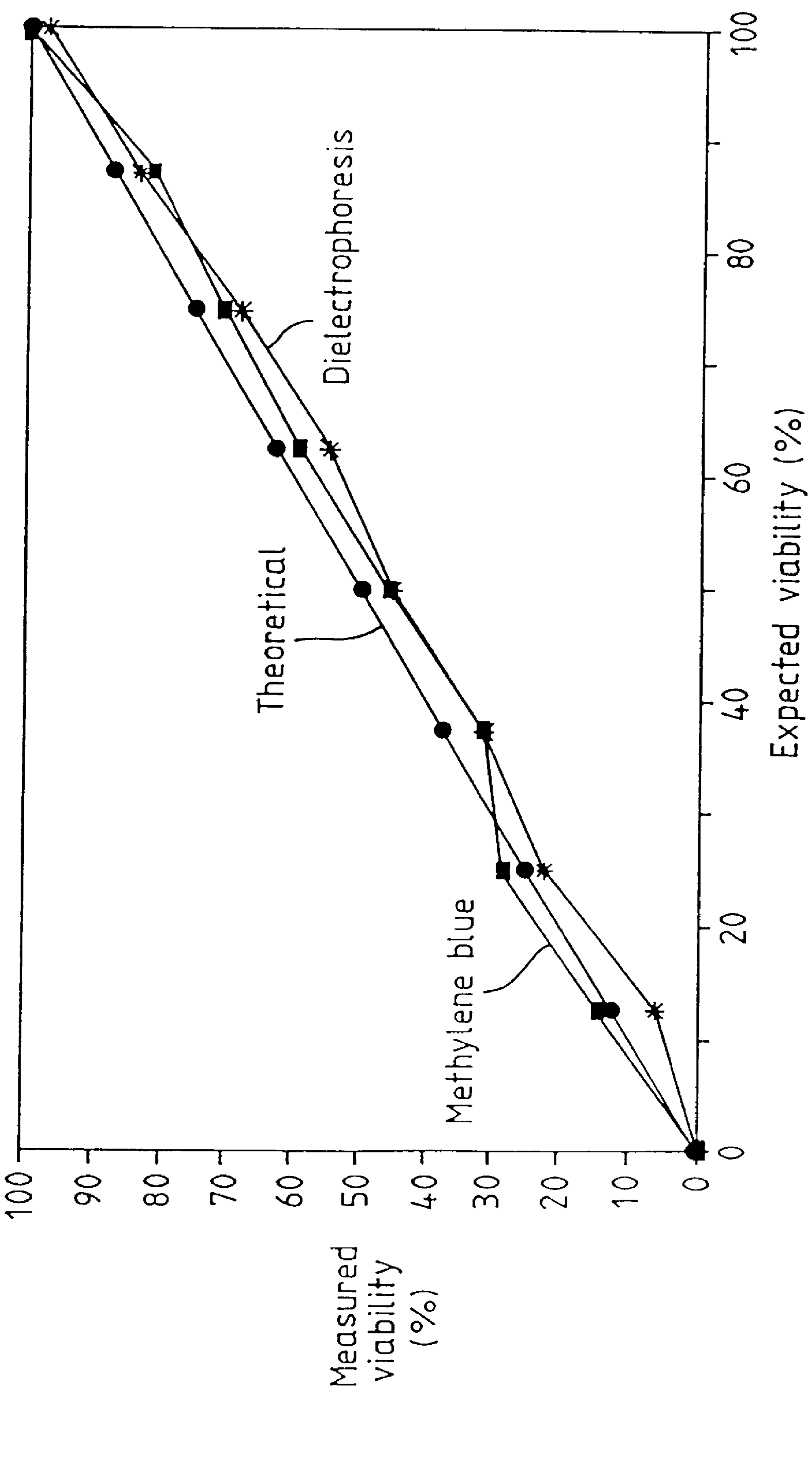
FIG. 24 shows a graph of percentage viability of mixed cell suspensions determined by methylene blue staining and dielectrophoretic behaviour, versus the expected viability from the mixtures made.

The relative numbers of viable and non-viable cells were obtained by direct microscopic inspection, as well as from photographic records, of cell collection at the electrodes as seen in FIG. 20. FIG. 23 shows diagrammatically how cells were syringed into the DEP separation chamber containing the microelectrodes, and after DEP separation their flushing-out was monitored by optical absorption. Cell viability was determined using methylene blue staining. FIG. 24 shows the measured cell viability versus the viability expected from the known composition of the cell mixtures. Good correlations can be seen (correlation coefficient r=0.992 and 0.995 for methylene blue staining and dielectrophoresis, respectively).

Figure 21:
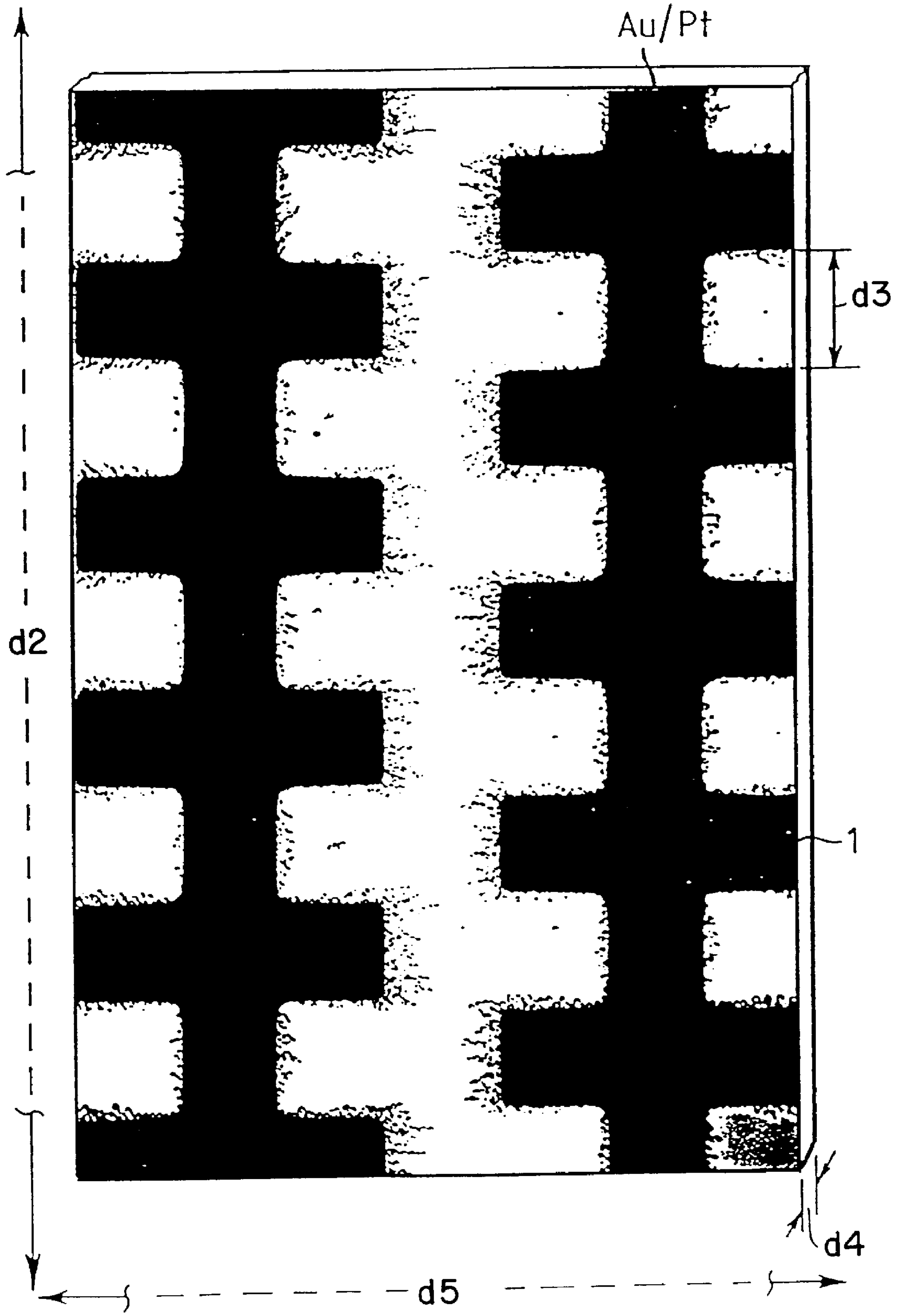
FIG. 21 shows the viable cells which remain in the chamber after flushing out the non-viable cells with the 10 MHz signal applied to the electrodes.
Figure 25:
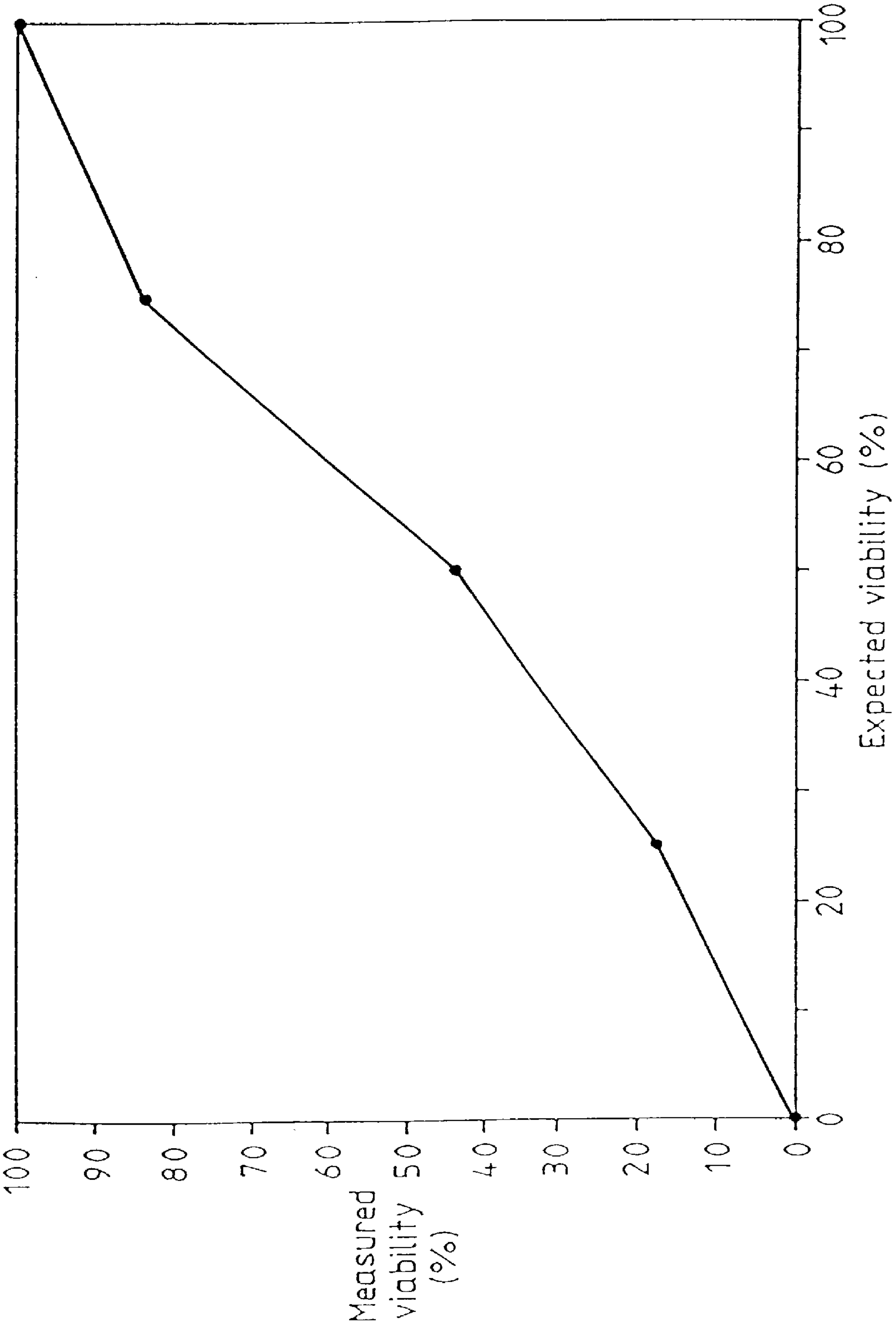
FIG. 25 shows a graph of viability obtained from absorbance measurements of an outflow of the filter chamber on selective flushing of first the viable and then the non-viable yeast cells, versus the viability expected from the mixtures made (r=0.980)

The cells were also separated by flushing the DEP chamber as described above, so as to first selectively remove the non-viable cells (FIG. 21) and then the viable cells. The relative numbers of negative DEP collected (non-viable) and positive DEP collected (viable) cells were determined by optical absorbance measurements. Previous studies (Burt et al., 1989) have shown for yeast concentrations up to around 1.4x107 cells $ml^{-1}$ that the optical absorbance in 1 cm path length cuvettes varies linearly with concentration (i.e. Beer’s law is obeyed). Apart from the linear relationship between cell concentration (checked for viable and non-viable cell suspensions) the advantage of operating within Beer’s law is that errors associated with multiple light scattering are avoided. In this work cell concentrations above $1.4\times10^7$ $ml^{-1}$ were not used. The results obtained are shown in FIG. 25, and a reasonable correlation is seen (r=0.980) with the initial known relative compositions of the suspensions. Examples of distances d2 through d5 shown in FIG. 21 are 1 cm, 40 $\mu$m, 1 $\mu$m, and 1 cm, respectively.

After DEP separation of a suspension prepared using 40% viable and 60% non-viable (heat treated) yeast cells, the two separated components were stained with methylene blue and plated-out on growth medium with 1.2% agar. Viable cells (3%) were still present in the fraction supposed to contain non-viable cells, whilst the fraction containing mainly viable cells also contained dead cells (8%). This shows that at the relatively high cell concentrations used in these experiments (ca $\mathbf{10}^7$ $ml^{-1}$) the separation was not 100% successful. At these concentrations non-viable (stained) cells were sometimes trapped or sterically hindered by the viable cells at the electrode edges. This effect was reduced if suspensions of lower density cells were used. On plating out good growth (cell recovery 100% to within experimental error) was obtained from fractions with viable cells, whilst only very few (3%) colonies were obtained from fractions containing non-viable cells. It was found that the yeast viability was not affected by the applied electric field in accord with earlier work of Förster and Emeis (1985) who demonstrated that the viability of the even more fragile yeast protoplasts is unaffected by dielectrophoresis.

FIG. 25 shows a graph giving good correlation for both methods (correlation coefficient r=0.992 and 0.995 for methylene blue and DEP, respectively;

CONCLUSIONS

From analyses of the dielectrophoretic and electrorotational behaviour of yeast cells, Huang et al. (1992) showed that the cytoplasmic membrane conductivity of the cells increased on heat treatment from $2.5\times10^{-7}$S $m^{-1}$ to $1.6\times10^{-4}$ S $m^{-1}$, in parallel with a decrease of the internal cell conductivity from 0.2 S $m^{-1}$ to $7\times10^{-3}$ S $m^{-1}$. These changes in cellular electric properties give rise to the differences in dielectrophoretic behaviour described here and form the basis of the separation technique.

The process of injecting cells into the separation chamber, trapping the cells using a 10 kHz signal and locally separating the viable from non-viable cells at the electrodes using a 10 MHz signal, can be achieved within 2 minutes. The measurements in which the numbers of viable and non-viable cells were counted at this stage of dielectrophoretic separation were made here by simple counting procedures, but this can be automated using image analysis techniques (Gascoyne et al., 1992). This procedure can therefore provide a rapid method for ascertaining cell viability, without the need for chemical treatment of the cells, and for selectively collecting the cells afterwards.

For $1.4\times10^{7}$ cells $ml^{-1}$ of 40% viability, a significant number (8%) of dead cells appeared in what should have been the fraction containing the selectively flushed-out viable cells alone. From direct microscopic observations of the DEP effect on methylene blue treated suspensions, this “contamination” was found to occur because non-viable cells were sterically hindered and even trapped by the viable cells. This effect was reduced significantly on 10-fold dilution of the initial suspension. Improved efficiency of separation can also be achieved by passing the cells through two or more stages of dielectrophoretic separation. Similar and/or other advantages may be gained from other microelectrode structures and geometries.

Finally, preliminary data with stationary cultures (data not shown) indicate that cells at different physiological states can be identified through their dielectrophoretic behaviour, and the behaviour of moribund cells may be different from that of both viable and non-viable cells. Apart from the potential for selective cell separation technologies, a comparison of the dielectrophoretic technique with staining methods for determining cell viability and physiological state could thus prove scientifically rewarding.

Another embodiment of the invention is described with reference to FIG. 26.

As high field strengths are necessary to observe dielectrophoresis, the effect is generally only observed on small scales using electrodes of the same order of size as the particles under investigation, at which such field strengths can be easily generated. However, as a consequence of the fact that the distance between the electrodes is very small the particles usually only move over short distances, and unless one uses many adjacent electrodes which are addressed consecutively (Burt & Pethig, 1990; Washizu et al., 1993), other forces such as those generated by a flowing liquid or gravity are needed to move cells over larger distances. Lin and Benguigui (1982) used interdigitated electrodes without castellations to separate inorganic particles from the flowing liquid. They did not attempt to separate particles with differing electrical properties nor did they attempt to make their system continuous. Markx et al. (1993) showed the separation of viable and non-viable yeast cells using interdigitated castellated electrodes, but no attempt was made to achieve continuous separation. Although continuous dielectrophoretic separation has been attempted before using concentric cylinders (Mason & Townsley, 1971) or so-called isomotive electrodes (Pohl, 1978a & b) to generate the dielectrophoretic force, the results were rather unsatisfactory and yields were very low. A cyclic counterflow regime in a chamber containing arrays of interdigitated castellated electrodes 40, with which an efficient continuous separation can be achieved, is described below with reference to FIG. 26 and FIGS. 13*a* to 13*d*. As a model system viable and non-viable yeast cells were taken.

Materials and Methods

Cells

The yeast cells used were, *Saccharomyces cerevisiae* strains RXII, obtained from the Free University in Berlin. The yeast was grown as described before (Markx et al., 1990), harvested and washed 4 times in deionised water. Non-viable yeast cells were obtained by heat treatment (20 min a 90° C.), and washes as described before. Non-viable and viable cells were then mixed in the ratio 50%—50% . The viability of the yeast cells was tested using methylene blue staining (Stoicheva et al., 1989). The optical density of the suspension used was 0.288, corresponding to a cell concentration of 7 E6 cells $ml^{-1}$.

Apparatus

Figure 26:
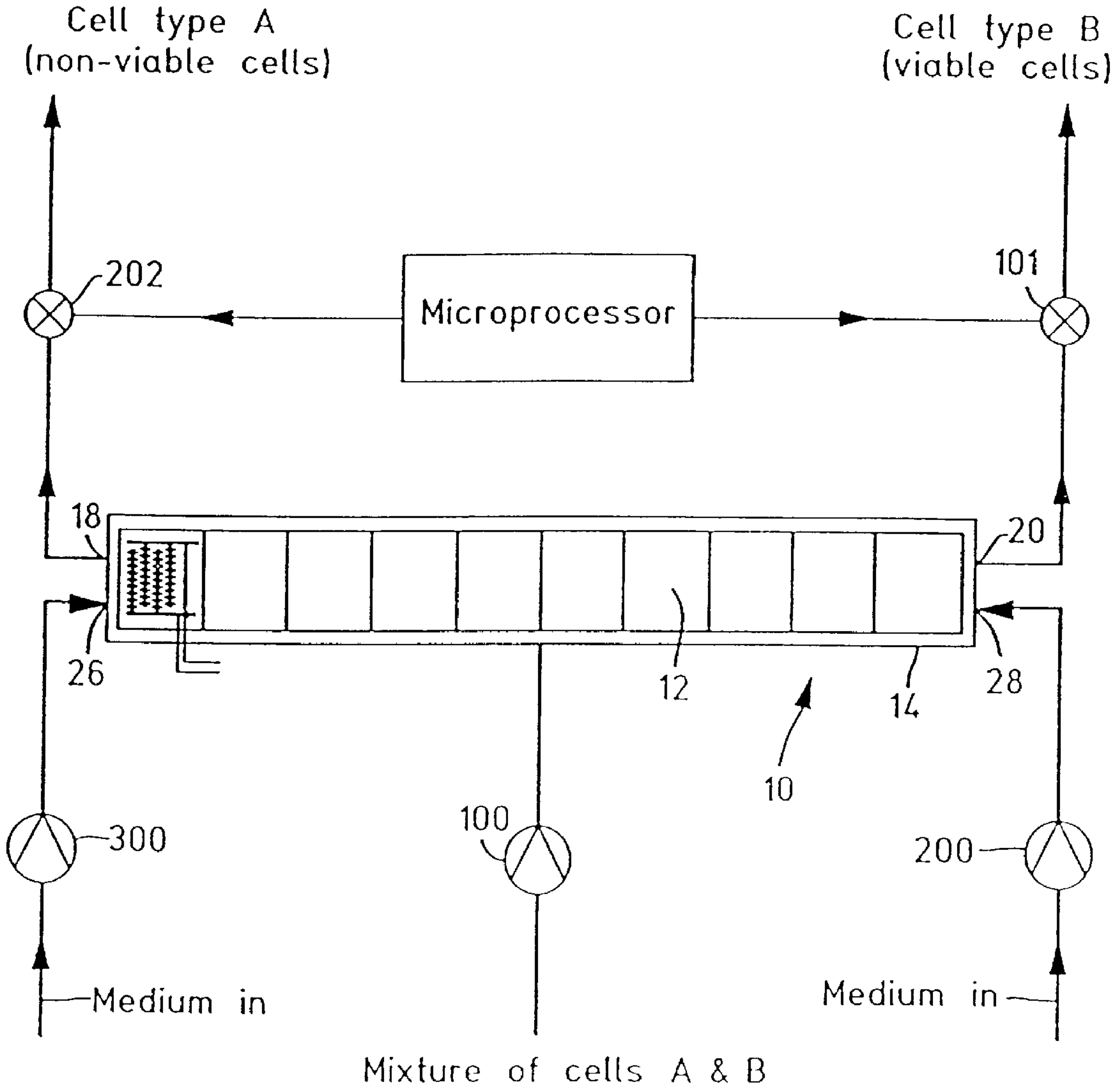
FIG. 26 shows a schematic view of a filter chamber with valves at each of two outlets.

The dielectrophoretic separation chamber is shown in FIG. 26. The interdigitated, castellated electrodes (made from gold on a chrome base, with a length of 20 mm, characteristic dimension of the castellations 70 $\mu$m) were fabricated on top of 12, 26 mm wide and 76 mm long microscope slides using photolithographic techniques. The microscope slides were glued on top of a glass plate. Connections to the electrodes on the microscope slides were made by soldering. A chamber was constructed above the electrodes using a 200 micron PTFE spacer and further microscope slides. Liquid was pumped in and out of the chambers through 1 mm inner bore PVC and silicone tubing. Cells were pumped in through the tube in the centre of the chamber, whilst fresh liquid without cells was pumped in through tubes at the two ends of the chamber, and liquid containing separated cells pumped out through two different tubes at the far ends of the chamber. The whole system was sealed using flowable silicone rubber (RS) and is sterilisable.

An outline of the complete steps of separation is shown in FIGS. 13*a* to 13*d*. 13*a*. The cells are brought in and the voltage is applied. Viable cells are attracted to high field regions between the electrodes, whilst non-viable cells are repulsed. 13*b*. A gentle fluid flow dislodges non-viable cells and moves them in one direction. The viable cells are still held. 13*c*. The applied voltage is set to zero. Both viable and non-viable cells are moved in the opposite direction. 13*d*. The voltage is applied again and the non-viable cells are moved again in the same direction as in b.

Peristaltic pumps (Gilson Minipuls 3 (Trade Mark)) and valves made from solenoids (RS) were used to control fluid flows. The flow rate of the pumps was in the order of 5.5 ml $min^{-1}$, AC voltages were applied by a Farnell LFM3 (Trade Mark) and a Krohn-Hite model 2000 (Trade Mark) frequency generators through a relay. The whole system was computer-controlled.

Continuous separation was achieved using the valve control regime shown in Table 1.

TABLE 1

Switching regime for continuous dielectrophoretic separation.

| | Period 1 | Period 2 | Period 3 | Period 4 |
|---|---|---|---|---|
| Applied voltage | 0V | 10V | 0V | 10V |
| Pump 100 | on | off | off | off |
| Pump 200 | off | on | off | on |
| Pump 300 | off | off | on | off |
| Valve 101 | on/off* | on | off | on |
| Valve 202 | on/off* | off | on | off |

*Valve 101 and 202 were closed alternatively.

After switching off a pump a period of 10 seconds was used to allow cells to settle, except after pumping cells into the system (period 1), for which 45 seconds settling time was used. However, these periods may be varied.

RESULTS AND CONCLUSIONS

It is apparent that at the left side of the chamber all cells are viable, whilst on the right side cells all are non-viable. This is in sharp distinction with the middle of the chamber where all cells are mixed. As expected, the separation improved when going further away from the center of the chamber, and a substantially complete (approximately 100%) separation of viable and non-viable cells was achieved at the exit of the chamber. This is in contrast with batch separation that were previously performed (Marks et al., 1993) and with which a 90–95% separation was achieved.

It is estimated that nearly complete separation was achieved at a distance of 3 cm from the point of inflow. This implies that as the chamber is 30 cm long it has a minimum estimated total of 5 ideal separation steps. In reality this is probably more as the flow near the point of inflow is not well defined, and will be better defined further away from it. For a fluid flow of 0.55 ml/min it took an estimated 2 hours to travel from the point of inflow to the outflow.

The use of this system for the separation of other cell types, in particular plant protoplasts. Friend Murine erythroleukamic cells and different species of bacteria is presently under investigation.

It will be appreciated that variation may be made to the above-mentioned embodiments and methods without departing from the scope of the invention. For example, it is understood that variation to the conductivity or relative permittivity of a suspending medium (such as a solvent or liquid) may be made so as to alter the effects of the DEP forces on particles experiencing the DEP effects. Similarly variation to the size and shape of electrode geometry may be made in order to permit high field gradients to be obtained, thus facilitating local confinement of two (or more) particle types within a generally small region.

Thus by varying the aforementioned characteristics and by careful selection of frequency applied to establish the DEP field, a high degree of selection of different species is possible.

Although described in the specific embodiments as having a relatively small area, it is envisaged that large electrode arrays may be assembled having a total area of 0.1–1 $m^2$. Such electrode arrays would permit a relatively large throughput of liquid medium, for example of the order of litres or tens of litres per minute. Similarly arrays of electrodes could be manufactured such that they lie above one another, thereby creating a three dimensional array.

Although reference has been made to a chamber wherein pressure urges liquid, supporting a mixture of particles to be separated, through the chamber, the invention may also be used as a dielectrophoretic column to separate several different species whose dielectrophoretic properties are similar. The invention configured to operate in this manner may be envisaged as performing separation by dielectrophoresis, in a similar manner as a chemical separator, such as a gas chromatograph. The control means is arranged to operate so as to pulse the supporting medium through the chamber when the field is activated.

Experiments using a 0.25 ml mixture of *micrococcus lysodeikticus* (Gram+ve), *Escherichia coli* (Gram –ve) and *Saccharomyces cerevisiae* suspended in 280 mM mannitol of conductivity 50 ms/m (adjusted using 1M NaCl) were allowed to pass through (an initially "loaded") column comprising two sets of castellated, interdigitated, microelectrodes forming one side of chamber of a column 0.25 ml. A 4–8 V (peak to peak) voltage signal was applied at 50 kHz (or 10~100 kHz). The yeast cells were collected first (~0.3 ml fraction) from the column. The *E-coli* were collected next (identified by lack of Gram staining in morphology); whilst the *M. lysodeikticus* were retained and later collected by flushing through chamber with the voltage removed. Thus continuous separation of three different species was possible.

It will also be appreciated that the invention is particularly effective when used to separate cellular matter, when the cellular matter is labelled. For example fluorescent labels such as *Fluorescein isothiocyanate* (FITC), gold or other chemical labels, cause variation in the conductance and/or permittivity of cellular matter. Careful choice of labels; electrical properties of the supporting fluid; and the frequency of applied electric fields, give rise to enhanced separation.

The invention has been described with specific reference to cellular matter. However, separation of non-cellular matter may also be achieved by using the invention.

Similarly coatings on the electrodes may enhance/inhibit chemical reactions. The coating(s) may comprise hydrophobic or hydrophilic chemicals, acidic or basic chemicals or antibodies. The fact that particles are confined by DEP forces enhances rates of reaction.

We claim:

1. An apparatus for separating first particles and second particles from a fluid supporting said first particles and said second particles, said apparatus comprising:

a housing forming a chamber, said housing having formed thereon an inlet, a first outlet, and a second outlet, said inlet and said first and said second outlets communicating with sald chamber;

a first electrode array and a second electrode array disposed within said chamber formed by said housing;

a fluid flow system supplying said fluid to said Inlet and removing said fluid from said first and said second outlets, thereby operating a fluid flow within said chamber;

frequenoy generating means connected to said first and said second electrode arrays for establishing a dielectrophoretic field between said first and said second electrode arrays to cause a first resultant force to be experienced by said first particles; and control means for controlling said frequency generating means and said fluid flow system to remove said fluid from said first outlet while said first resultant force is experienced by said first particles, said control means including means to change said dielectrophoretic field to cause a second resultant force to be experienced by said second particles.

2. An apparatus acoording to claim 1, wherein said fluid flow system includes:

a conduit forming a fluid carrying passage, said conduit being coupled to said housing via said inlet; and a selectively operable pressure source coupled to said conduit so as to provide said fluid to said inlet via said conduit.

3. An apparatus according to claim 1, wherein said fluid flow system further comprises:

a second conduit coupled to said housing via said first outlet;

a third couduit coupled to said housing via said second outlet; and at least one valve disposed in one of said second conduit and said third conduit.

4. An apparatus according to any of claims 1, 2 or 3, wherein:

said fluid flow system further comprises a gravity feed.

5. An apparatus according to any of claims 1, 2 or 3, wherein:

said fluid flow system further comnpries a pump.

6. An apparatus according to claim 2, wherein said fluid flow system further comprises:

a second conduit forming a first fluid carrying passage coupled to said housing via said first outlet;

a third conduit forming a second fluid carrying passage coupled to said housing via said second outlet;

at least one valve disposed in one of said second conduit and said third conduit, wherein said control means includes a microprocessor adapted to activate said dielectrophoretlo field, said at least one valve, and said pressure source in synchronism.

7. An apparatus according to claim 2, wherein:

each of said first and said second electrode arrays comprises sub-groups of electrodes, and said control means controls said frequency generating means to cause said sub-groups of said first electrode array and said sub-groups of said second electrode array to be actuated in a cyclic manner.

8. An apparatus according to claim 1, further comprising:

means for varying a potential difference between adjacent electrodes of said first electrode army and said second electrode array.

9. An apparatus according to claim 1, further comprising:

means for varying a frequency of voltage applied between adjacent electrodes of said first electrode array and said second electrode array.

10. An apparatus according to claim 1, wherein:

said first electrode array and said second electrode array are interdigitated; castellated electrodes.

11. An apparatus according to claim 1, wherein:

one of said first particles and said second particles is live cellular matter, and the other of said first particles and said second particles is dead cellular matter, and said apparatus is arranged to separate said live cellular matter from said dead cellular matter.

12. An apparatus according to claim 1, wherein:

at least one of said first electrode array and said second electrode array includes:

an electrical contact for connection to an electrical energy source having a polarity which is controlled to change, and a surface adapted for use in said chamber.

13. An apparatus according to claim 1, wherein:

at least one of said first electrode aray and said second electrode array is coated with a substance to perform at least one of enhance and inhibit a chemical reaction.

14. An apparatus for separating first particles and second particles from a fluid supporting said first particles and said second particles, said apparatus comprising:

a housing forming a chamber capable of holding said fluid, said housing forming an inlet for allowing said fluid to flow into said chamber, a first outlet for allowing one of said first particles and said second particles to flow out of said chamber, and a second outlet for allowing a remaining one of said first particles and said second particles to flow out of said chamber;

a first electrode array disposed in said chamber and being capable of contacting said fiuld;

a second electrode array disposed in said chamber and being capable of contacting said fluld;

a fluid flow system supplying said fluid to said inlet and removing said fluid from said first and said second outlets, thereby creating a fluid flow within said chamber;

a frequency source operatively coupled to said first and said second electrode arrays and adapted to establish a dielectrophoretic field between said first electrode army and said second electrode array;

control means for controlling said frequency source, said control means providing that said dielectrophoretic field includes a first dielectrophoretic force and a second dielectrophoretic force in an alternating fashion, said first dielectrophoretic force being experienced by at least one of sald first particles and said second particles, and said second dielectrophoretic force being experienced by at least one of said first particles and said second particles.

15. An apparatus according to claim 14, wherein:

said first electrode array and said second electrode array are interdigitated, castellated electrodes.

16. An apparatus according to claim 14, wherein said frequency source is a single frequency generator.

17. A method for selectively separating first type particles from second type particles, said method comprising:

flowing a fluid containing said first type particles and said second type particles into a chamber formed by a housing, said chamber having a first and a second electrode array disposed therein, said housing forming a first inlet, a second inlet, a third inlet, a first outlet, and a second outlet, said fluid flowing into said chamber through said first inlet;

activating a power source to establish a dielectrophoretic field between said first electrode array and said second electrode array to cause a first resultant force to be experienced by said first type particles and flowing a second fluid, containing none of said first type and said second type particles, through said second inlet to cause said second type particles to move in a first directlon, said second fluid exiting said chamber through said first outlet;

deactivating said power source and flowing said second fluid through said third inlet to cause said first type particles and said second type particles to move in said second direction, said second direction being in a direction opposite to said first direction, said second fluid exiting said chamber through said second outlet; and reapplying said power source to reestablish said dielectrophoretic field between said first electrode array and said second electrode array; and flowing said second fluid through said second inlet to cause said second type particles to move in said first direction, said second fluid exiting said chamber through said first outlet.

18. A method according to claim 17, wherein:

said fluid flows into said chamber through said first inlet by an action of a first pump, said fluid flows into said chamber through said second inlet by an action of a second pump, and said fluid flows into said chamber through said third inlet by an action of a third pump.

19. A method acoording to claim 17 or 18, wherein each of said first and said second electrode arrays comprises sub-groups of electrodes, and said dielectrophoretic field is changed by activating said sub-groups of said first electrode array and said sub-groups of said second electrode array in a cyclic manner.

20. A method according to claim 18, wherein when said fluid flows through said chamber, said flowing is accomplished by urging said fluid through said chamber using a pressure source.

21. A method according to claim 20, wherein:

at least one of said second type particles and said first-type particles are removed from said chamber using said pressure source.

22. A method according to claim 17, further comprising:

labelling at least one of said first type particles and said second type particles of one of on and before entering said chamber in order to enhance separation of said second type particles from said first type particles.

23. A method according to claim 22, wherein;

said step of labeling uses gold to label said at least one of said first type particles and said second type particles.

* * * * *